(12) United States Patent
Chen et al.

(10) Patent No.: US 11,695,796 B1
(45) Date of Patent: Jul. 4, 2023

(54) DEVICE VULNERABILITY DETECTION DURING DEVICE HANDSHAKE

(71) Applicant: Amazon Technologies, Inc., Seattle, WA (US)

(72) Inventors: Li Chen, Seattle, WA (US); Ali Haldun Taner, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 40 days.

(21) Appl. No.: 17/118,077

(22) Filed: Dec. 10, 2020

(51) Int. Cl.
*H04L 29/06* (2006.01)
*H04L 9/40* (2022.01)
*H04L 9/32* (2006.01)

(52) U.S. Cl.
CPC ........ *H04L 63/1433* (2013.01); *H04L 9/3247* (2013.01); *H04L 9/3268* (2013.01); *H04L 63/061* (2013.01); *H04L 63/12* (2013.01); *H04L 63/166* (2013.01)

(58) Field of Classification Search
None
See application file for complete search history.

(56) References Cited

U.S. PATENT DOCUMENTS 9,888,037 B1 * 2/2018 Sharifi Mehr ........ H04L 63/205
10,454,689 B1 * 10/2019 Sharifi Mehr ........ H04L 63/166
2003/0126472 A1 * 7/2003 Banzhof ............... G06F 21/577
    726/25
2006/0005257 A1 * 1/2006 Tohru ................... G11B 27/329
2020/0287888 A1 * 9/2020 Moore ............... H04L 63/0884
2022/0053023 A1 * 2/2022 Althouse ............... H04L 63/166
2022/0124074 A1 * 4/2022 Petri ....................... H04L 63/20

FOREIGN PATENT DOCUMENTS

WO WO-2009018512 A1 * 2/2009 ........... H04L 63/166

* cited by examiner

*Primary Examiner* — Benjamin E Lanier
(74) *Attorney, Agent, or Firm* — Athorus, PLLC

(57) ABSTRACT

Described are implementations that analyze the unencrypted messages of a cryptographic protocol handshake between two devices and/or the receipt or absence of encrypted messages of the handshake to detect security vulnerabilities of one or both of those devices. For example, the unencrypted messages of a TLS handshake between a client device and a server may be analyzed to determine security vulnerabilities of the client device. Because the disclosed implementations utilize the unencrypted messages of a handshake and/or detection of the receipt or absence of encrypted messages of the handshake, involvement in the handshake or decryption of encrypted messages of the handshake is not necessary. The requirement is that the disclosed implementations are able to observe the messages of a handshake that are used to establish a secure communication between the devices.

22 Claims, 21 Drawing Sheets

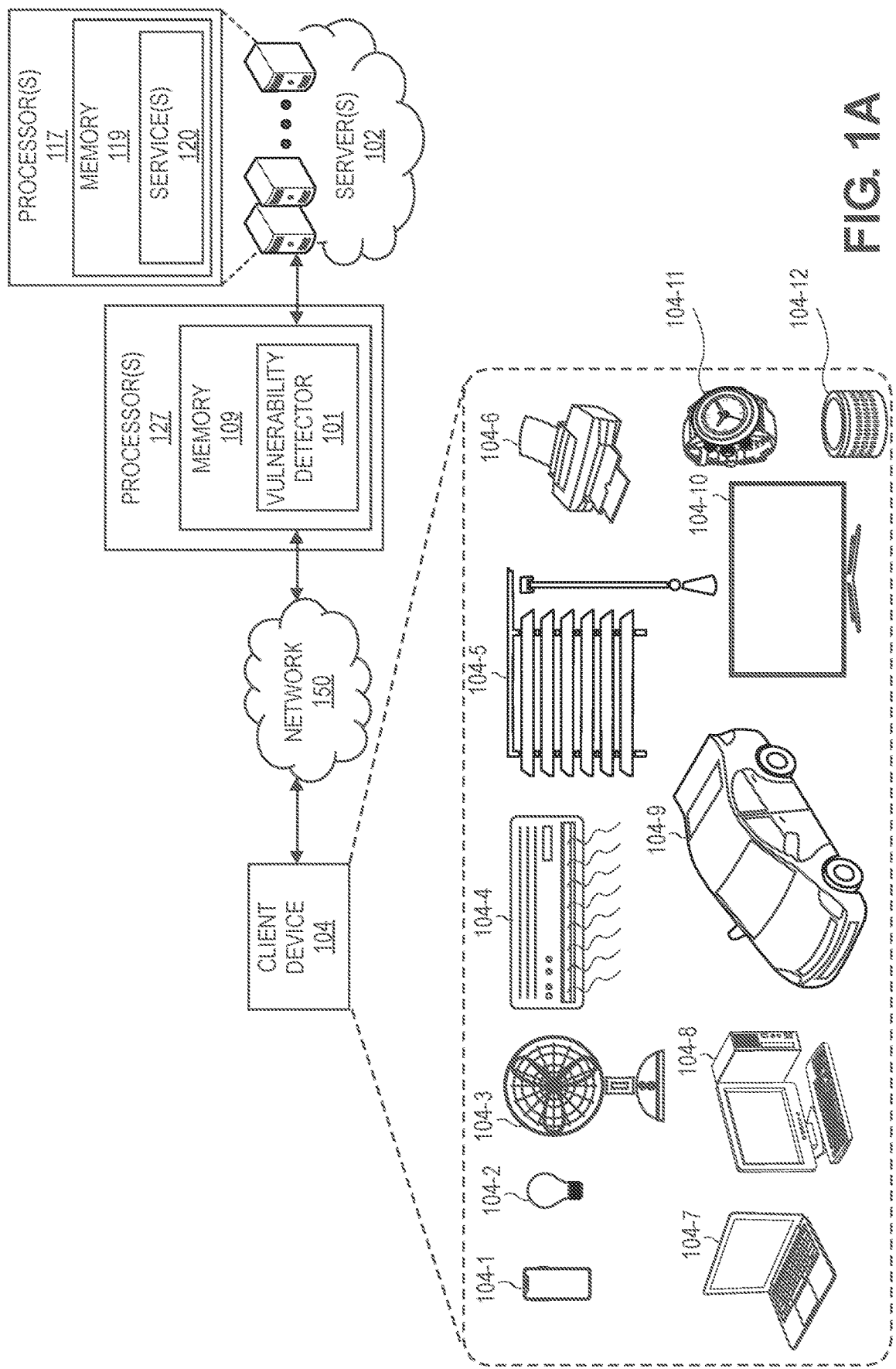

US 11,695,796 B1

DEVICE VULNERABILITY DETECTION DURING DEVICE HANDSHAKE

BACKGROUND

Cryptographic protocols, such as Transport Layer Security ("TLS"), are designed to provide communication security over a computer network through use of a two-way encrypted channel between two parties. TLS is used in many different applications such as web browsing, client device and server communications, email, Voice over IP, autonomous device control, etc. However, with the wide use of TLS and other cryptographic protocols, attempts are often made to subvert the security those protocols provide. As a result, cryptographic protocols, such as the TLS protocol have been revised several times to defend against potential security weaknesses. However, the numerous updates to the protocols themselves present security risks when devices operate on outdated protocols and/or are misconfigured.

BRIEF DESCRIPTION OF DRAWINGS

The detailed description is described with reference to the accompanying figures.

FIGS. 1A and 1B are block diagrams of example connections between a client device and one or more servers that includes a vulnerability detector, in accordance with described implementations.

DETAILED DESCRIPTION

Figure 1B:
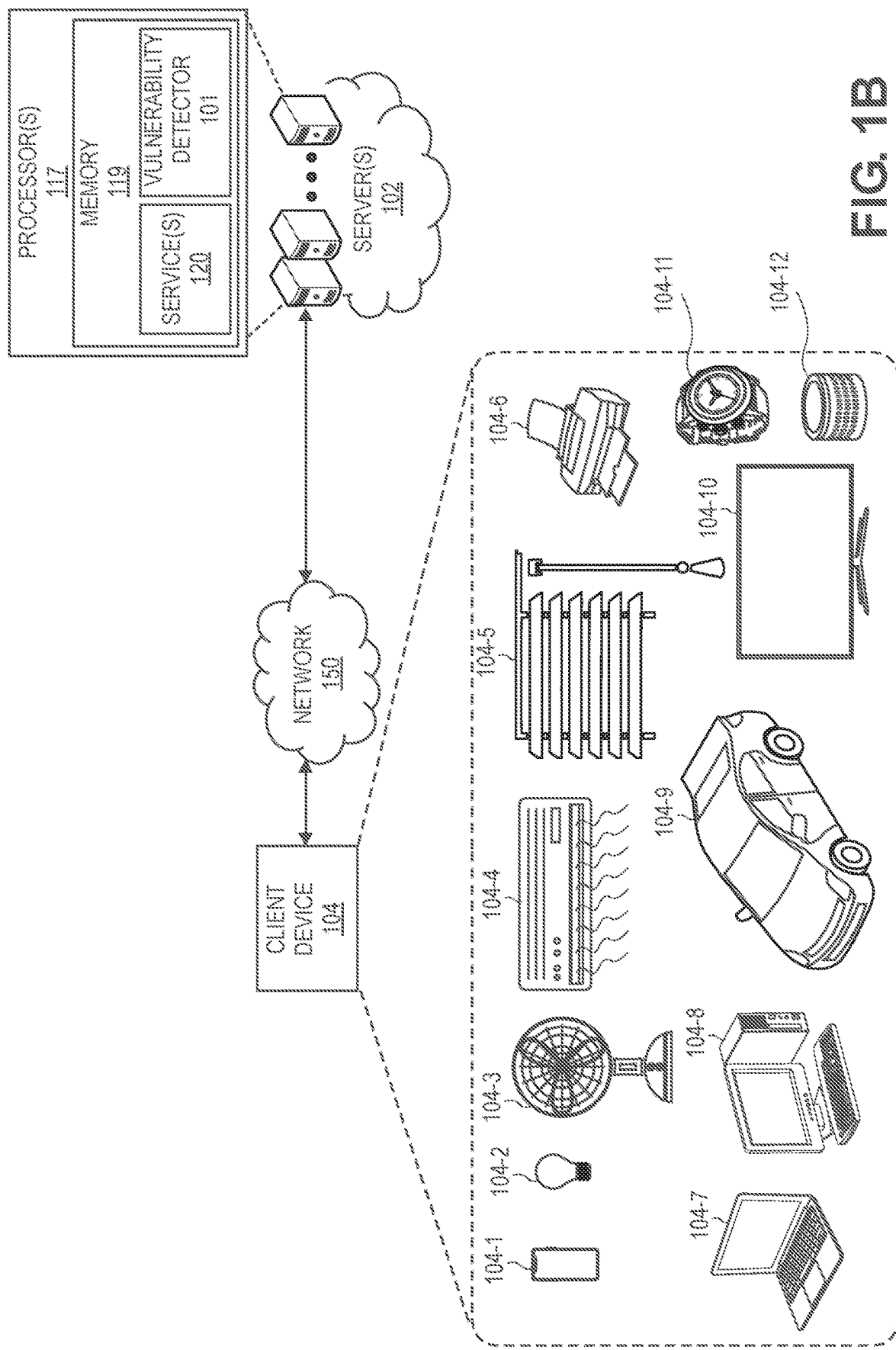

Described are systems, methods, and computer-implemented methods that analyze the unencrypted messages of a cryptographic handshake between two devices and/or detect the presence or absence of encrypted messages of the cryptographic handshake to determine security vulnerabilities of one or both of those devices. For example, the unencrypted messages of a TLS handshake between a client device and a server may be analyzed to determine security vulnerabilities of the client device (referred to herein as client device vulnerabilities or simply vulnerabilities) and/or the server. Because the disclosed implementations utilize the unencrypted messages of a handshake and/or detect the presence or absence of encrypted messages of the handshake, such as a TLS handshake, involvement in the handshake or decryption of encrypted messages of the handshake are not necessary. The requirement is that the disclosed implementations are able to access, receive, or otherwise observe messages of a handshake that is used to establish a secure communication between the devices.

For example, through analysis of the unencrypted message of the TLS handshake and/or determination of the presence or absence of encrypted messages of the TLS handshake, as discussed further below, the disclosed implementations can determine one or more device vulnerabilities of a client device (also referred to herein as a first device) when the client device is performing a TLS handshake with a server (also referred to herein as a second device). Device vulnerabilities may include, but are not limited to, that the protocol version supported by the client device is outdated, that the device time of the client device is incorrect, that a client random (a random string of data that is used later during the handshake to generate the cryptographic keys) is not random, that one or more cipher suites of a plurality of cipher suites indicated by the client device as part of the TLS handshake are unsupported cipher suites, that a validation of the server by the client device is based on an invalid server certificate, whether a client certificate provided by the client device as part of the TLS handshake is expired or about to expire, whether the client certificate is properly signed, and/or whether the signature of the client device that is used to digitally sign a message sent by the client device to the server as part of the TLS handshake corresponds to the client device/client certificate. Likewise, the disclosed implementations may also determine whether the server certificate provided by the server to the client device is valid or invalid and/or properly signed. While the disclosed implementations describe detection of the above listed vulnerabilities of a client device and/or a server, in other examples, the disclosed implementations may be utilized to detect or verify other information that is exchanged as part of a handshake to establish a secure communication between two or more devices through analysis of unencrypted portions of the handshake and/or detection of the presence or absence of encrypted portions of the handshake. For example, the disclosed implementations may also be used to determine whether the server random included in the server hello message is random.

In some implementations, the disclosed implementations may be used to test a client device to determine vulnerabilities and provide a client device vulnerability log so those vulnerabilities can be resolved. For example, the disclosed implementations may be used in a testing environment to test a device prior to production and launch of the device, or prior to deploying a revision to a device to identify and resolve device vulnerabilities that may present security risks to the device and/or other devices to which the device connects. In other examples, the disclosed implementations may be used to determine device vulnerabilities of deployed devices in a production environment and provide notifications indicating identified vulnerabilities so that the vulnerabilities of those devices can be resolved, such as through an update to the TLS protocol supported by the vulnerable device, etc.

While the disclosed implementations refer primarily to the TLS protocol and TLS handshake, it will be appreciated that the disclosed implementations may also be used with other protocols that utilize a handshake to establish an encrypted communication between two or more devices. The use of the TLS protocol and the TLS handshake are used as one example implementation to clarify the explanation and are not limiting. Likewise, while a client device and a server are used to discuss the disclosed implementations, as discussed further below, it will be appreciated that the disclosed implementations may be used to detect vulnerabilities through analysis of unencrypted messages of a handshake between any type of devices and should not be limited to just a client and server communication. The use of a client device and a server are used to simplify the discussions presented herein and are not limiting.

As is known, a TLS handshake between a client device and a server, or any other handshake to establish an encrypted communication, includes a series of unencrypted messages between the client device and the server that are needed to establish the encrypted communication. By receiving, obtaining, or accessing some or all of the unencrypted messages, the disclosed implementations are able to determine a variety of device vulnerabilities of the client device and/or the server. Likewise, as discussed further below, detecting the presence or absence of encrypted messages of a handshake may also be used to determine device vulnerabilities. As noted above, the requirement is that the disclosed implementations be able to access, receive, or otherwise observe the messages exchanged as part of the handshake. Accordingly, the location of components providing the disclosed implementations within the network may vary, as discussed further below.

FIGS. 1A and 1B are block diagrams of example connections between a client device 104 and one or more servers 102 that includes a vulnerability detector 101, in accordance with described implementations.

As illustrated, a client device 104 may be any device that connects to a network 150, such as the Internet, to establish an encrypted communication with a server 102. For example, the client device may be, but is not limited to, a smart phone 104-1, a smart device, such an autonomous or controllable lightbulb 104-2, fan 104-3, heater/air conditioner 104-4, window blinds 104-5, etc. Other examples of a client device include a network connected printer 104-6, a laptop 104-7, desktop 104-8, network connected automobile 104-9, network connected television 104-10, wearable 104-11, voice activated device 104-12, or any other type of device or sensor. Common expressions associated with example client devices include smart devices, connected devices, Internet of Things ("IoT") devices, etc.

In the illustrated example, and as discussed further below, the client device 104 communicates with a service 120 executing on a server 102 through a connection over a network 150, such as the Internet, an intranet, wide area network, local area network, direction connection, etc. As illustrated in FIG. 1A, a vulnerability detector 101 is positioned between the network 150 and the server 102 and may be stored in a memory 109 as program instructions that are executable by one or more processors 127. The vulnerability detector 101 may be communicatively connected with the server and able to provide commands and/or instructions to the server 102. In other implementations, such as illustrated in FIG. 1B, the vulnerability detector 101 may be included in the server 102. In either of the example configurations illustrated in FIGS. 1A and 1B, the vulnerability detector 101 may be operable to send commands and/or instructions to the sever 102. In other implementations, the vulnerability detector may not be operable to send commands and/or instructions to the server and may only receive and/or access messages exchanged as part of a handshake between the client device 104 and the server 102.

The server(s) 102 illustrated in FIGS. 1A and 1B may include one or more processors 117 and a memory 119 storing program instructions, such as a service 120 that are executed by the one or more processors. As illustrated, the server 102 may be implemented as one or more servers and may, in some instances, form a portion of a network-accessible computing platform implemented as a computing infrastructure of processors, storage, software, data access, and so forth that is maintained and accessible by client devices 104 of via the network 150.

The network 150, and each of the other networks discussed herein, may utilize wired technologies (e.g., wires, USB, fiber optic cable, etc.), wireless technologies (e.g., radio frequency, infrared, near-field-communication (NFC), cellular, satellite, BLUETOOTH, etc.), or other connection technologies. The network 150 is representative of any type of communication network, including data and/or voice network, and may be implemented using wired infrastructure (e.g., cable, CAT5, fiber optic cable, etc.), a wireless infrastructure (e.g., radio frequency, cellular, microwave, satellite, BLUETOOTH, etc.), and/or other connection technologies.

Figure 2:
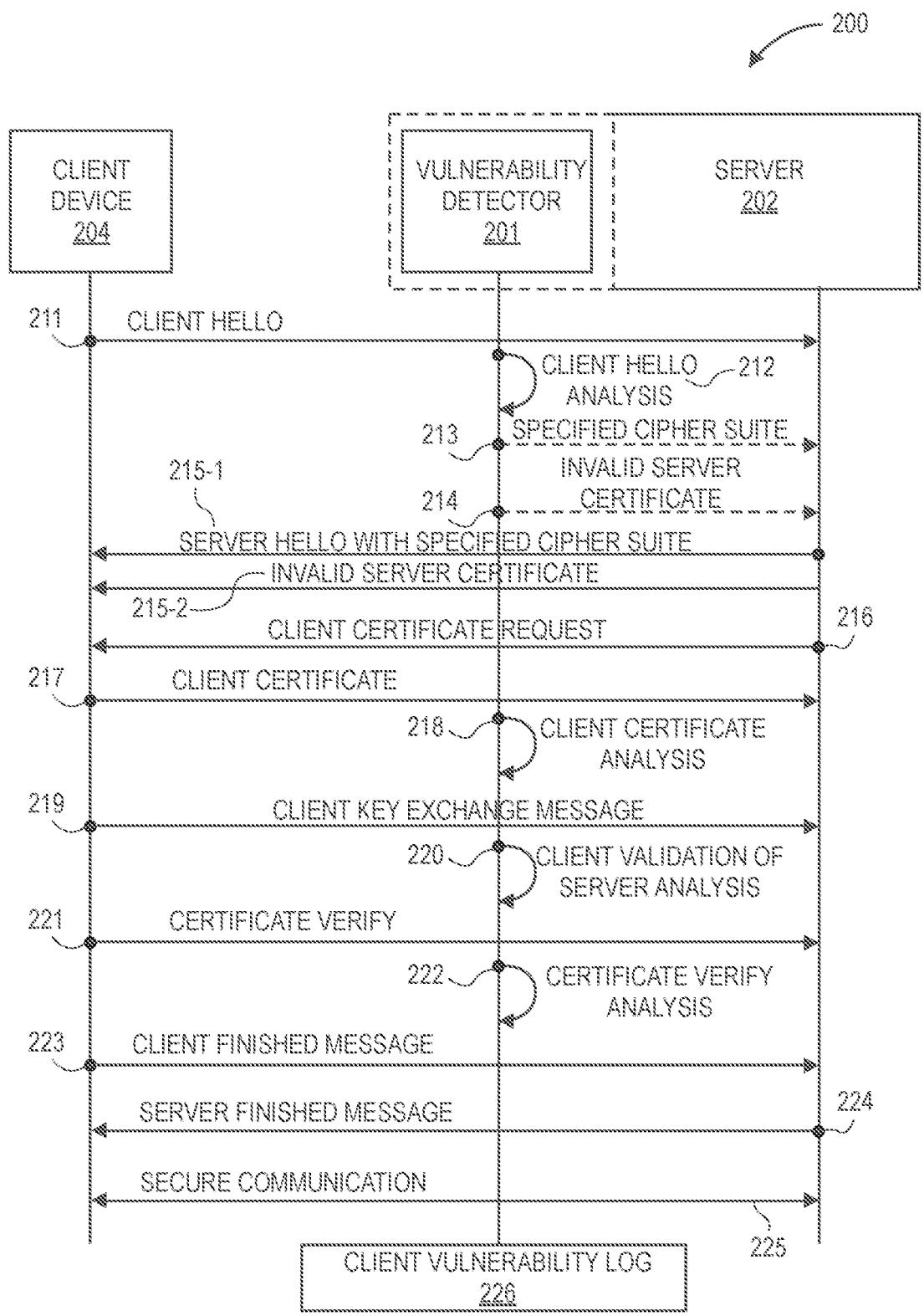
FIG. 2 is a transition diagram of a handshake, such as a TLS handshake, between a client device and a server, including analysis of unencrypted messages of the handshake by a vulnerability detector, in accordance with described implementations.

FIG. 2 is a transition diagram 200 of a handshake, such as a TLS handshake, between a client device 204 and a server 202, including analysis of unencrypted messages of the handshake and/or detection of the presence or absence of the encrypted messages of the handshake by a vulnerability detector 201, in accordance with described implementations.

As is typical for a handshake, such as a TLS handshake, at 211 a client hello message, which is unencrypted, is sent from the client device 204 to the server 202. The client hello message may contain one or more of a protocol version indicating a version of a protocol, such as the TLS protocol version supported by the client device, a client random, an indication of a plurality of algorithm suites supported by the client device, also referred to herein as cipher suites, compression methods used by the client device 204, optionally a Server Name Indication ("SNI") indicating an endpoint to which the client device intends to connect, and/or other information that is to be exchanged as part of the handshake. In some implementations, a client device time may also be included in the client hello message.

As illustrated, the vulnerability detector 201, which may be included in the server 202 or separate from but communicating with the server 202, may receive or otherwise access the client hello message sent from the client device 204 to the server 202 and, at 212, perform a client hello analysis on the client hello message. As discussed in further detail below with respect to FIG. 4, analysis of the client hello message may be used to determine if the client device is using a current protocol version, such as a current TLS protocol version. Likewise, the analysis of the client hello message may be used to determine if one or more cipher suites in the indication of the plurality of cipher suites in the client hello message are all supported cipher suites. Analysis of the client hello message may also be used to determine if the client random is random and/or if the client device time, if included, is correct. Other information included in the client hello message necessary for a handshake and establishment of an encrypted communication between the devices may also be analyzed with the disclosed implementations. In this example, if it is determined that any one of the protocol version supported by the client device is not current, one or more of the indicated plurality of cipher suites is not supported, that the client random is not random, and/or that the client device time is incorrect, a client vulnerability log 226 for the client device may be updated to indicate the determined vulnerability.

Likewise, because the vulnerability detector communicates with the server 202, it may be determined at 213 whether a particular cipher suite from the plurality of cipher suites should be selected by the server 202 to test whether the client device 204 does indeed support the selected cipher suite. Alternatively or in addition thereto, at 214 it may be determined whether an invalid server certificate should be generated and/or selected and sent from the server 202 to the client device 204 as part of the handshake to test whether the client device will validate an invalid server certificate.

In response to the client hello message, at 215-1 the server 202 sends a server hello message, which is unencrypted and includes, among other information, selection of a cipher suite. In some implementations, the server hello message may also include a server certificate. In other implementations, the server certificate 215-2 (either a valid server certificate or an invalid server certificate), may be sent as a separate server certificate message. For example, the server certificate message, which is also unencrypted, may be sent either before or after the server sends the server hello message. In addition, at 216 the server 202 may optionally send a client certificate request, which is unencrypted, requesting that the client provide a client certificate as part of the handshake. Similar to the server certificate message, the client certificate request may be part of the server hello message or a separate message.

If a client certificate request is sent from the server 202 to the client, at 217 the client, provided it supports the selected cipher suite and verifies the server based on the server certificate included in the server hello message, sends a client certificate, which is unencrypted. At 218, the vulnerability detector receives or accesses the client certificate and performs a client certificate analysis. As discussed further below, the client certificate analysis may determine if the client certificate is expired or about to expire and/or if the client certificate is properly signed.

In addition to optionally sending the client certificate, in response to the server hello message and/or the server certificate, the client 204, at 219, sends a client key exchange message. In some implementations, the client key exchange message may be encrypted with the server public key, which is determined from the server certificate. In other implementations, the client key exchange message may not be encrypted. As discussed further below, based on the server certificate sent from the server and the presence or absence of the client key exchange message sent from the client and/or the client certificate sent form the client device, at 220 it may be determined whether the client device 204 improperly validated the server based on an invalid server certificate.

At 221, the client may also send a certificate verify message that is digitally signed with a signature of the client device 204. The vulnerability detector, at 222, upon receiving the certificate verify message, may analyze the certificate verify message and determine, based at least in part on the client certificate and the client public key included in the client certificate, whether the digital signature used to sign the certificate verify message corresponds to the client device 204.

Finally, at 223 the client device 204 may send a client finished message and, at 224, the server 202 may send a server finished message, which is encrypted, indicating that each has completed the handshake and computed an encryption key that may be used by each of the client device 204 and the server 202 to encrypt messages sent between the client device 204 and the server 202, thereby establishing at 225 an encrypted communication between the client device 204 and the server 202.

As the vulnerability detector analyzes the unencrypted messages of the handshake and/or the presence or absence of encrypted messages of the handshake, detected vulnerabilities may be included in a client vulnerability log 226. Upon completion of the handshake or upon completion of analysis, the client vulnerability log 226 may be provided to cause the vulnerabilities to be resolved. For example, the client vulnerability log 226 may be provided to an agent that is testing the client device using the disclosed implementations to indicate the detected vulnerabilities.

During testing of a client device, some or all of the handshake and analyses may be performed numerous times before the client vulnerability log is provided. For example, if the client hello message identifies ten different cipher suites supported by the client device, the vulnerability detector may perform all or a portion of the handshake ten times, each time sending a different server hello message that indicates a different selected cipher suite to confirm whether each indicated cipher suite of the plurality of cipher suites is actually supported by the client device 204. As another example, the handshake may be performed several times with different invalid server certificates being sent by the server to determine if the client device will validate any/all of the invalid server certificates.

A "log," as used herein, such as a client vulnerability log or a server log, refers to any form of data, storage, or other information that may be used to store and/or convey data or information. For example, a client vulnerability log may be a file stored in a memory (local, remote, permanent, removable, etc.) that indicates one or more determined client device vulnerabilities.

For client devices that are in use/production, the vulnerability detector may maintain information about a client device and each time the client device initiates a handshake with the server, the vulnerability detector may cause the server to test different cipher suites and/or test server certificate validation with different invalid server certificates.

Figure 3A:
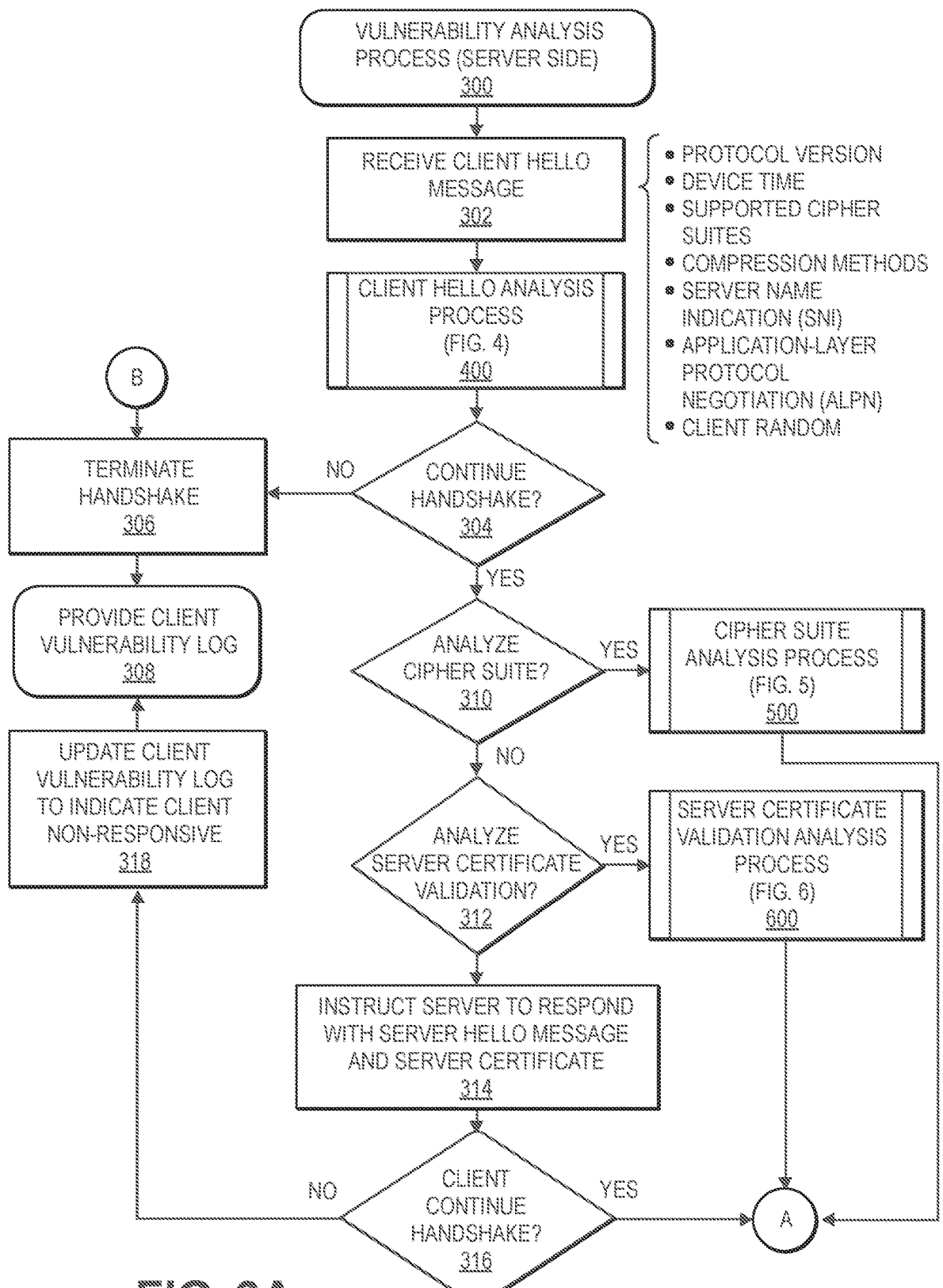
FIGS. 3A through 3C is an example vulnerability analysis process, in accordance with described implementations.
Figure 3B:
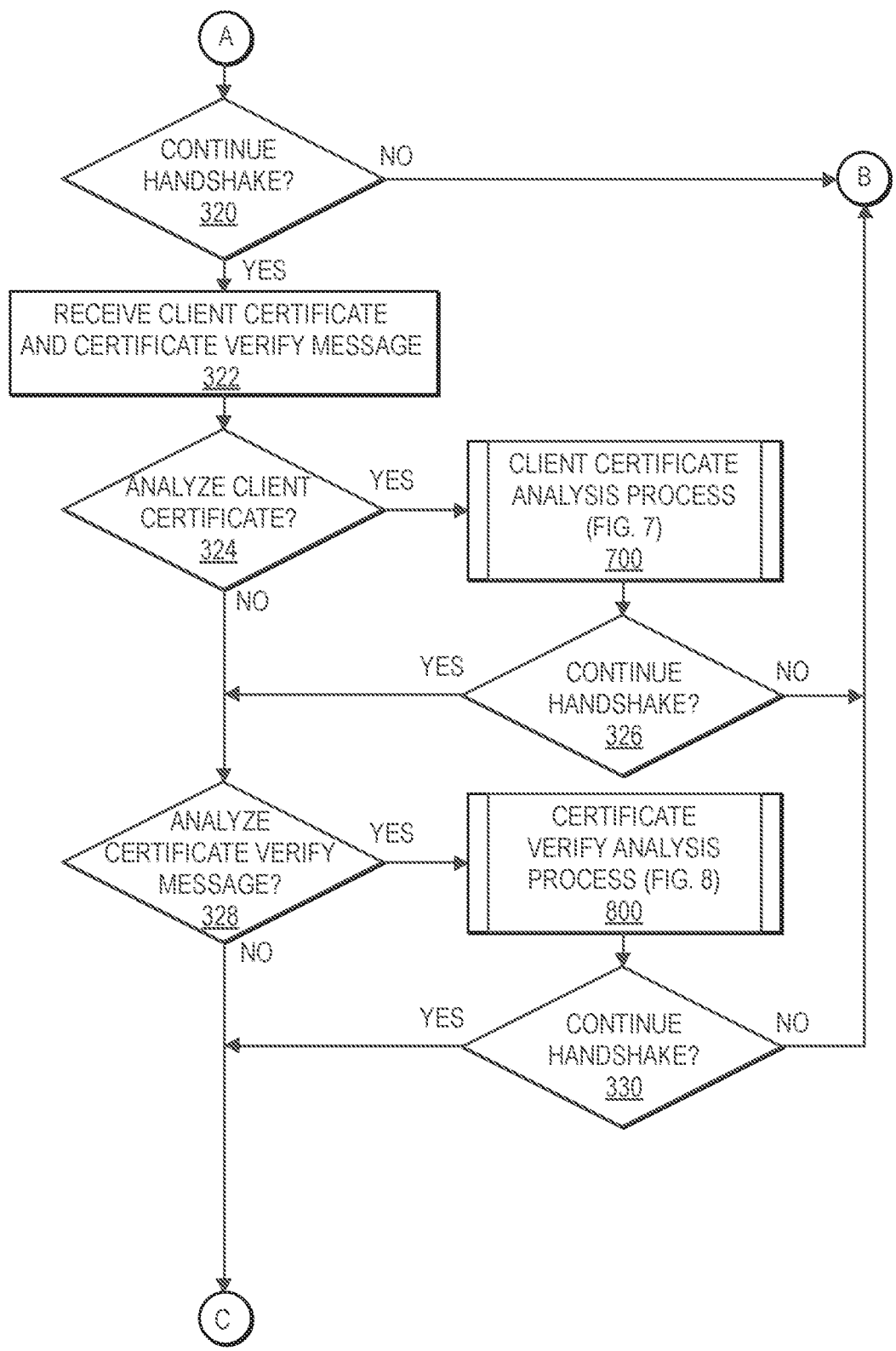
Figure 3C:
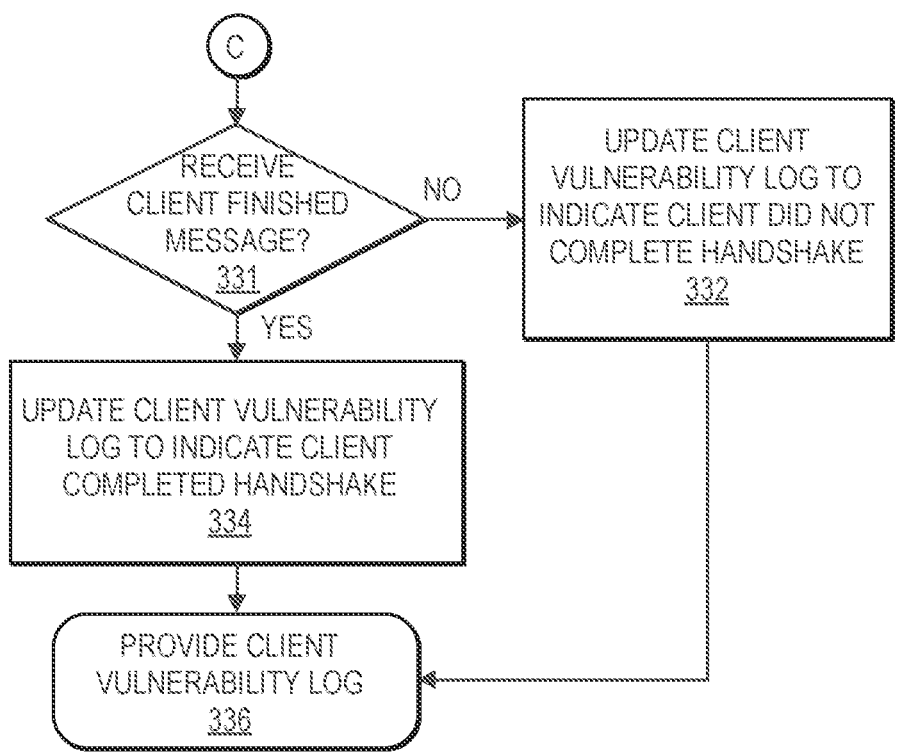

FIGS. 3A through 3C is an example vulnerability analysis process 300, in accordance with described implementations.

Referring first to FIG. 3A, the example process begins upon receipt of a client hello message sent from a client device to a server, as in 302. The client hello message is unencrypted and may include one or more of a protocol version, such as a TLS protocol version to be used, a client random, an indication of a plurality of cipher suites supported by the client device (which may be indicated or listed in an order of preference to the client device), compression methods supported by the client device, optionally a SNI to which the client device is requesting to connect, and/or optionally an Application-Layer Protocol Negotiation ("ALPN") indicating the application protocol to be used. The client hello message may also contain a client device time.

Upon receipt of the client hello message, a client hello analysis process 400 may be performed to determine any client vulnerabilities that are detectable from the client hello message. For example, and as discussed in further detail below with respect to FIG. 4, the client hello analysis process 400 may process the client hello message to determine if the protocol version is out of date, if one of the indicated cipher suites in the plurality of cipher suites is unsupported, and/or if the client random included in the client hello message is not random.

Upon completion of the client hello analysis process 400, a determination may be made as to whether the handshake between the client device and the server is to continue, as in 304. For example, if the example process 300 is being performed in a testing environment to identify client device vulnerabilities, it may be determined that the handshake is to continue even if client device vulnerabilities were determined from the client hello analysis process. In comparison, if the example process 300 is being performed on a handshake from a client device that is in use or in production that is requesting to establish a secure connection with a server, it may be determined that the handshake is not to continue if one or more client device vulnerabilities were determined from the client hello analysis process. For example, if it is determined that the protocol indicated in the client hello message for use is out of date and therefore the client device is potentially vulnerable to a security attack by a third party, to protect the server and the client device, it may be determined that the handshake is not to continue.

If it is determined that the handshake is not to continue, the handshake is terminated, as in 306, and a client vulnerability log is provided to cause the determined client device vulnerabilities to be resolved, as in 308. For example, the example process executing on a vulnerability detector positioned between the client device and the server (or included in the server), may send a handshake termination message to one or both of the client device and/or the server that will cause the client device and/or the server to terminate the handshake, for example by sending a closure alert message and terminating the connection between the client device and the server.

As discussed further below, the client vulnerability log may include an indication of each client vulnerability determined from the example process 300 and may be sent to an agent responsible or associated with the client device to inform the agent of the determined client device vulnerabilities so those vulnerabilities may be resolved. In other examples, the client vulnerability log may also or alternatively be provided to the server and/or another service that is operable to connect to the client device and cause the vulnerabilities to be resolved. For example, the server and/or another service may be operable to connect to the client device and update the protocol version supported by the client device, update a list of cipher suites supported by the client device, reset or adjust the device time of the client device to correspond to a desired time, such as a global clock, update the client device to provide random data as the client random, etc.

Returning to FIG. 3A, if it is determined at decision block 304 that the handshake is to continue, a determination is made as to whether a cipher suite from the plurality of cipher suites indicated in the client hello message is to be analyzed, as in 310. If it is determined that a cipher suite is to be analyzed, the cipher suite analysis process 500 is performed. The cipher suite analysis process is discussed further below with respect to FIG. 5.

As discussed further below, some or all of the cipher suites in the plurality of cipher suites indicated in the client hello message may be analyzed to confirm that the client device actually supports those cipher suites. For example, if the example process 300 is being performed in a testing environment to test vulnerabilities of a client device, it may be determined that each cipher suite indicated in the plurality of cipher suites is to be analyzed to confirm that the client device actually supports those cipher suites. In such an example, as discussed below, after it is confirmed that a cipher suite is supported, the handshake may be terminated and the example process 300 restarted to analyze the next cipher suite in the plurality of cipher suites. Likewise, if a selected cipher suite is not actually supported, the selection of that cipher suite may cause a termination by the client device of the handshake. In such an instance, the unsupported cipher suite may be indicated in a client vulnerability log and the example process 300 restarted to analyze a next cipher suite of the plurality of cipher suites.

In comparison, if the example process 300 is being performed on a handshake from a client device that is in use or in production that is requesting to establish a secure connection with a server, rather than restarting the client handshake after confirming that a cipher suite is actually supported by the client, it may be indicated in a client vulnerability log (or elsewhere) that the cipher suite has been analyzed and is supported by the client device. If, at a later time, the client device again initiates a handshake that is received by the example process 300, the example process may determine which cipher suites of the plurality of cipher suites have been analyzed and select another cipher suite from the plurality of cipher suites indicated in the client hello message for analysis. Such a configuration allows analysis of cipher suites indicated in the client hello message without disrupting the handshake between the client device and the server, unless it is determined that a selected cipher suite is not actually supported by the client device.

If it is determined that a cipher suite is not to be analyzed by the example process 300, a determination is made as to whether a server certificate validation is to be analyzed, as in 312. If it is determined that a server certificate validation is to be analyzed, the server certificate validation analysis process 600 is performed. The server certificate validation analysis process 600 is discussed further below with respect to FIG. 6.

As discussed further below, server certificate validation may be analyzed by causing the server to send an invalid server certificate (e.g., expired, incorrectly signed, mismatch between subject name in certificate and SNI in client hello message). If the client device validates the server based on the invalid server certificate, such an improper validation may be indicated as a client device vulnerability. In comparison, if the client device, in response to receiving the invalid server certificate, terminates the handshake, such a termination may be indicative of the client device operating as expected.

While the determination as to whether to perform the cipher suite analysis process 500 (FIG. 5) is before the determination as to whether to perform the server validation process 600 (FIG. 6), the determinations may be done in any order. Likewise, in some implementations, the example process may determine to simultaneously analyze both the cipher suite through the cipher suite analysis process 500 and the server validation through the server certificate validation analysis process 600 (FIG. 6).

If it is determined that the server certificate validation is not be analyzed, the example process 300 may send an instruction to the server to respond with a server hello message and a valid server certificate for the server, and optionally a request for a client certificate, as in 314. The server hello message may include an agreed upon protocol version, a cipher suite selected by the server from the plurality of cipher suites indicated in the client hello message, a compression method selected by the server from the compression methods indicated in the client hello message, another random string, referred to as a server random, that may be used later in the handshake to generate cryptographic keys, and/or other information.

The server certificate or a certificate chain (aka certification path) is used to authenticate or verify the identity of the server to the client device. The server certificate includes a digital signature that binds together server's public key with the server's own identity. Typically, the server certificate will be signed by a Certificate Authority ("CA") that is independent of the server and the client device. Alternatively, the server certificate may be self-signed by the server's own private key, rather than signed by a CA. For ease of explanation, as used herein, a server certificate and whether a server certificate is valid or invalid (e.g., whether a server certificate is properly signed) refers to both an individual server certificate and/or a chain of server certificates.

After sending the server hello message and server certificate at block 314, a determination is made as to whether the client continued the handshake, as in 316. It may be determined that the client continued the handshake if a client key exchange message (pre-master secret) is received from the client device and/or if a client certificate is received from the client device (if a client certificate request was sent from the server). In some implementations, the client key exchange message may be encrypted with the server public key. In other implementations, the client key exchange message may not be encrypted. Because a client key exchange message may be encrypted, the example process 300 may only be monitoring for the presence or absence of the client key exchange message.

The client key exchange message is sent according to the cipher suite selected by the server in the server hello message and is used to generate a master secret from which both the client device and the server will derive the final cryptographic keys required to establish the encrypted communication between the client device and the server. The client key exchange message provides the server with the required data to generate the keys for the symmetric encryption.

If it is determined that the client did not continue the handshake, the client vulnerability log is updated to indicate that the client terminated the handshake, as in 318. Alternatively, or in addition thereto, the client vulnerability log may be updated to indicate that the client may not actually support the selected cipher suite, which resulted in the client not continuing the handshake. In some examples, the client may send a closure alert closing the connection between the client device and the server, thereby terminating the handshake. In some examples, the closure alert may indicate why the handshake is being terminated. In other examples, the closure alert may not include any additional information. Finally, the example process 300 may complete with the client vulnerability log being provided, as in 308.

Turning now to FIG. 3B, in response to determining that the client continued the handshake at decision block 316, upon completion of the cipher suite analysis process 500 (FIG. 5), or upon completion of the sever certificate validation analysis process 600 (FIG. 6), a determination is made as to whether the handshake is to continue, as in 320. For example, if the example process 300 is being performed in a testing environment to identify client device vulnerabilities, it may be determined that the handshake is to continue even if client device vulnerabilities were determined from the cipher suite analysis process 500 (FIG. 5) and/or the server certificate validation analysis process 600 (FIG. 6). In comparison, if the example process 300 is being performed on a handshake from a client device that is in use or in production that is requesting to establish a secure connection with a server, it may be determined that analysis is not to continue if one or more client device vulnerabilities were determined from the cipher suite analysis process and/or the server certificate verification process. For example, if it is determined that the client device validated an invalid server certificate, therefore potentially exposing the client device to malicious behavior from a server, it may be determined that the handshake is not to continue.

If it is determined that the handshake is not to continue, the example process 300 returns to block 306 (FIG. 3A) and continues. If it is determined that the handshake is to continue, provided that the server hello message included a client certificate request, a client certificate and a certificate verify message sent from the client device to the server is received, as in 322.

The client certificate, similar to the server certificate is sent by the client device and used by the server to verify the identity of the client device. The client certificate is typically signed by a CA, but in some instances may be self-signed. Likewise, the client certificate may also include the client public key corresponding to the client. Client certificates and requirement of client certificates may be useful in cases where a server is keeping track of hundreds of thousands or millions of client devices. For example, a server that receives requests from numerous IoT devices may issue a unique client certificate per device, and then limit connections to the server to only those devices by blocking connections where the client device does not present a client certificate signed by a CA known to the server.

The certificate verify message is sent by the client device to prove to the server that the client device possesses the private key corresponding to client public key included in the client certificate. The certificate verify message typically includes hashed information (e.g., a hash of all the messages exchanged so far during the handshake process) which is digitally signed by the client.

If a client certificate request was not included in the server hello message, the example process may skip blocks 324, 700, 326, 328, 800, and 330 and proceed to block 331 (FIG. 3C), discussed further below.

Upon receiving the client certificate, a determination may be made as to whether the client certificate is to be analyzed, as in 324. If it is determined that the client certificate is to be analyzed, the client certificate analysis process 700 (FIG. 7) is performed. As discussed further below with respect to FIG. 7, the client certificate analysis process may be used to determine if the client certificate is expired, about to expire, and/or properly signed.

Upon completion of the client certificate analysis process 700, a determination may be made as to whether the handshake is to continue, as in 326. For example, if the example process 300 is being performed in a testing environment to identify client device vulnerabilities, it may be determined that the handshake is to continue even if client certificate is expired, about to expire, and/or not properly signed. In comparison, if the example process 300 is being performed on a handshake from a client device that is in use or in production that is requesting to establish a secure connection with a server, it may be determined that the handshake is not to continue if one or more client device vulnerabilities were determined from the client certificate analysis process. For example, if it is determined that the client certificate is expired and/or not properly signed, therefore potentially exposing the server to malicious behavior, it may be determined that the handshake is not to continue. As another example, if the client certificate is about to expire, it may be determined that the handshake can continue, but a notification may be sent to the client device or an agent associated with the client device indicating that the client certificate needs to be renewed.

If it is determined at decision block 326 that the handshake is not to continue, the example process returns to block 306 and continues. If it is determined at decision block 326 that the handshake is to continue, or if it is determined at decision block 324 that the client certificate is not to be analyzed, a determination is made as to whether the certificate verify message received from the client is to be analyzed, as in 328. If it is determined that the certificate verify message is to be analyzed, the certificate verify analysis process 800 (FIG. 8) is performed. As discussed further below with respect to FIG. 8, the certificate verify analysis process 800 may determine if the signature of the client matches the client certificate.

After completion of the certificate verify analysis process 800, a determination is made as to whether the handshake is to continue, as in 330. For example, if the example process 300 is being performed in a testing environment to identify client device vulnerabilities, it may be determined that the handshake is to continue even if the client signature on the certificate verify message does not match the client certificate. In comparison, if the example process 300 is being performed on a handshake from a client device that is in use or in production that is requesting to establish a secure connection with a server, it may be determined that the handshake is not to continue if the signature on the certificate verify message does not match the client certificate.

If it is determined at decision block 330 that the handshake is not to continue, the example process returns to block 306 and continues. If it is determined that the handshake is to continue at decision block 330, or if it is determined at decision block 328 that the certificate verify message is not to be analyzed, a determination is made as to whether a client finished message sent from the client device to the server has been received, as in 331 (FIG. 3C). The client finished message, which is encrypted with the session key generated through the handshake, indicates to the server that the client has completed the handshake, has generated the session key, and is ready to begin exchange of encrypted data.

If it is determined that the client finished message is not received, the client vulnerability log may be updated to indicate that the client did not complete the handshake, as in 332. In comparison, if it is determined that the client finished message is received, the client vulnerability log may be updated to indicate that the client finished the handshake, as in 334.

Finally, after updating the client vulnerability log to indicate that the client device completed the handshake (334) or did not complete the handshake (332), the client vulnerability log may be provided to cause the determined client device vulnerabilities to be resolved, as in 336.

As discussed, the client vulnerability log may include an indication of each client vulnerability determined from the example process 300 and may be sent to an agent responsible or associated with the client device to inform the agent of the determined client device vulnerabilities so those vulnerabilities may be resolved. In other examples, the client vulnerability log may also or alternatively be provided to the server and/or another service that is operable to connect to the client device and cause the vulnerabilities to be resolved. For example, the server and/or another service may be operable to connect to the client device and update the protocol version supported by the client device, update a list of cipher suites supported by the client device, reset or adjust the device time of the client device to correspond to a desired time, such as a global clock, update the client device to provide random data as the client random, update the client certificate if it is expired or about to expire, etc.

As described, the disclosed implementations provide a technical improvement to devices and/or an operation of devices through the analysis of unencrypted messages of a cryptographic handshake and/or the presence or absence of encrypted messages of the cryptographic handshake to detect and resolve device vulnerabilities of the devices involved in the handshake. Such techniques improve both the security and operation of devices and reduces the risk of malicious attacks against those devices.

Figure 4:
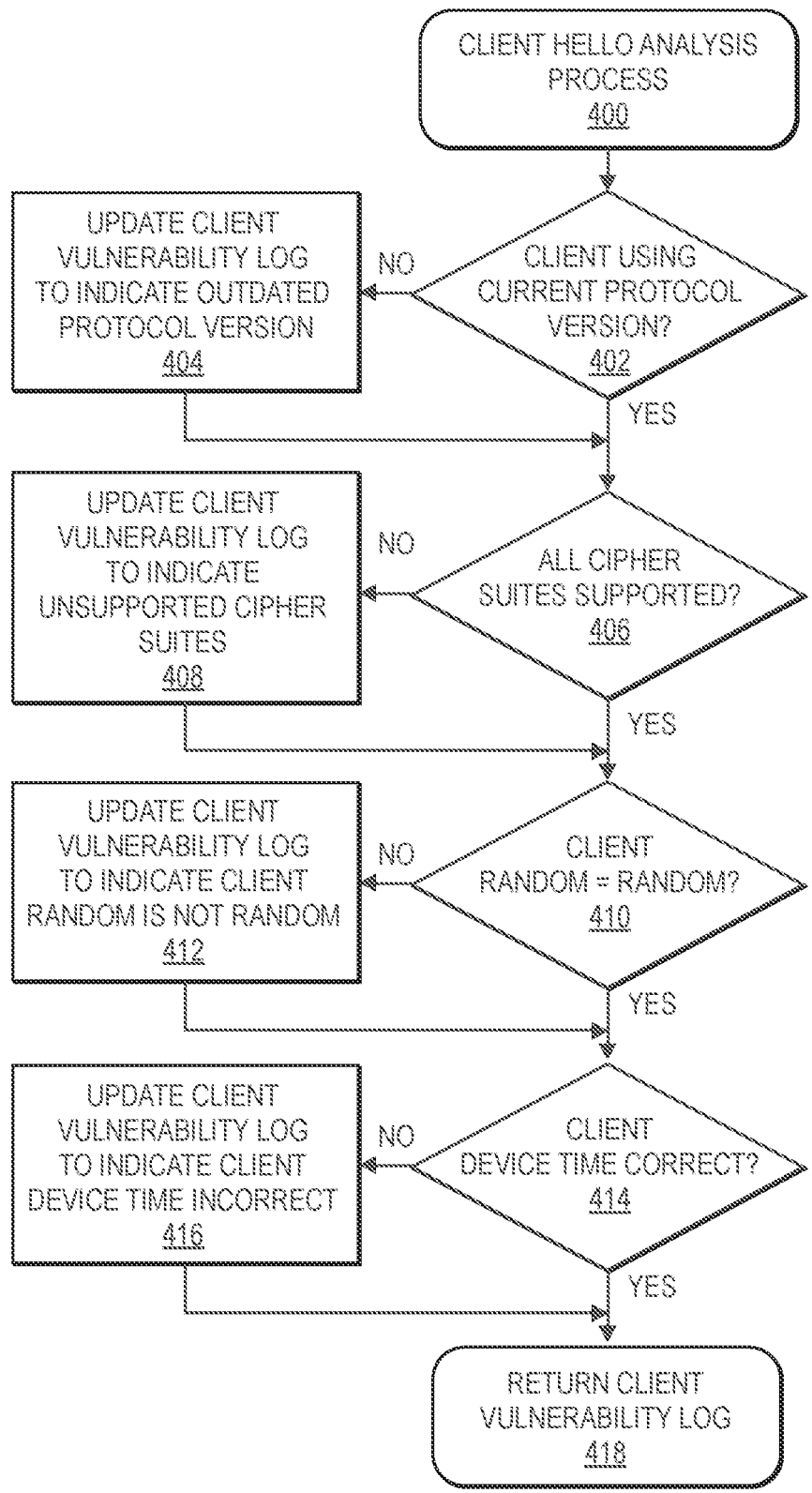
FIG. 4 is an example client hello message analysis process, in accordance with described implementations.

FIG. 4 is an example client hello message analysis process 400, in accordance with described implementations. As discussed above, the example process 400 may be performed as part of a handshake analysis process 300 (FIG. 3) to determine client device vulnerabilities. In particular, the client hello message analysis process 400 analyzes the client hello message that is sent from the client device to the server at the start of a handshake, such as a TLS handshake. As noted above, the client hello message is unencrypted.

The example process 400 begins by processing the client hello message to determine if the client device has indicated that it is using a current handshake protocol version, as in 402. As discussed above, the client hello message may include a protocol version that is supported by the client device. Accordingly, the indicated protocol version included in the client hello message may be used to determine if the client device is utilizing the current protocol version or a prior version that is no longer supported.

Because of ongoing attempts to circumvent security protocols, such as TLS protocols, those protocols are periodically updated to maintain security. As a result, prior versions of those protocols for which security risks have been identified, become unsupported. If a client device is not updated and is using an outdated security protocol, the client device and/or a server to which the client device connects may be vulnerable to malicious attacks.

If it is determined that the protocol version supported by the client is not the current version of the protocol, the client vulnerability log may be updated to indicate that the client is utilizing an outdated protocol version, as in 404.

If it is determined at decision block 402 that the client device is using the current protocol version, or after updating the client vulnerability log at block 404 to indicate that the client device is using an outdated protocol version, a determination may be made as to whether all cipher suites indicated in the client hello massage are supported cipher suites, as in 406. A cipher suite, also referred to herein generically as an algorithm suite, is a set of algorithms that help secure a network connection, such as a network connection that uses TLS. Like protocol versions, new cipher suites are generated to resolve newly determined security risks and older cipher suites may become unsupported due to identified security risks. Accordingly, the plurality of cipher suites indicated in the client hello message may be compared with a list of currently supported cipher suites to determine if any of the cipher suites in the plurality of cipher suites are no longer supported. A list of supported cipher suites may be maintained by a community or entity(s) that maintains the protocol, such as the TLS protocol, and made available to those using the protocol. An unsupported cipher suite included in the plurality of cipher suites indicated in the client hello message presents a security risk to both the client and the server. For example, if the server selects the unsupported cipher suite from the plurality of cipher suites, the encryption generated through the handshake and used for the secure communication between the client device and the server may be vulnerable to a malicious attack.

If it is determined that one or more cipher suites of the plurality of cipher suites indicated in the client handshake are not supported cipher suites, the client vulnerability log may be updated to indicate the cipher suites included in the plurality of cipher suites that are not supported, as in 408.

If it is determined at decision block 406 that all cipher suites are supported, or after updating the client vulnerability log at block 408, a determination may be made as to whether the client random is random, as in 410. For example, in prior TLS protocol versions, a portion of the client random included a device time—i.e., all of the data in the client random was not random. Current versions of the TLS protocol do not recommend including the device time in the client random and instead recommend that the entire string of data in the client random be random data. In this example, the example process 400 may analyze the client random to determine if the data in the client random is all random or if some or all of the data included in the client random includes other information, such as a device time. If the client random includes information other than random data, it may be determined that the client random is not random. If it is determined that the client random is not random, the client vulnerability log may be updated to indicate that the client random is not random, as in 412.

If it is determined at decision block 410 that the client random is random, or after updating the client vulnerability log to indicate that the client random is not random, if a client device time is included in the client hello message, a determination is made as to whether the client device time is correct, as in 414. For example, the client device time indicated in the client hello message may be compared to a global clock to determine if the client device time corresponds to the global clock time, or is within a defined difference of the global clock time. If it is determined that the client device time is incorrect, the client vulnerability log may be updated to indicate that the client device time is incorrect, as in 416.

If it is determined at decision block 414 that the client device time is correct, or after updating the client vulnerability log to indicate that the client device time is not correct, the client vulnerability log may be returned to the example process 300 and the example process 400 may complete, as in 418.

While the example process 400 indicates that the determinations of whether the client is using a current protocol version (decision block 402), whether the plurality of cipher suites are all supported (decision block 406), whether the client random is random (decision block 410), and whether the client device time is correct (decision block 414) are shown in order, the determinations may be done in any order and/or two or more of the determinations may be done in parallel.

Figure 5:
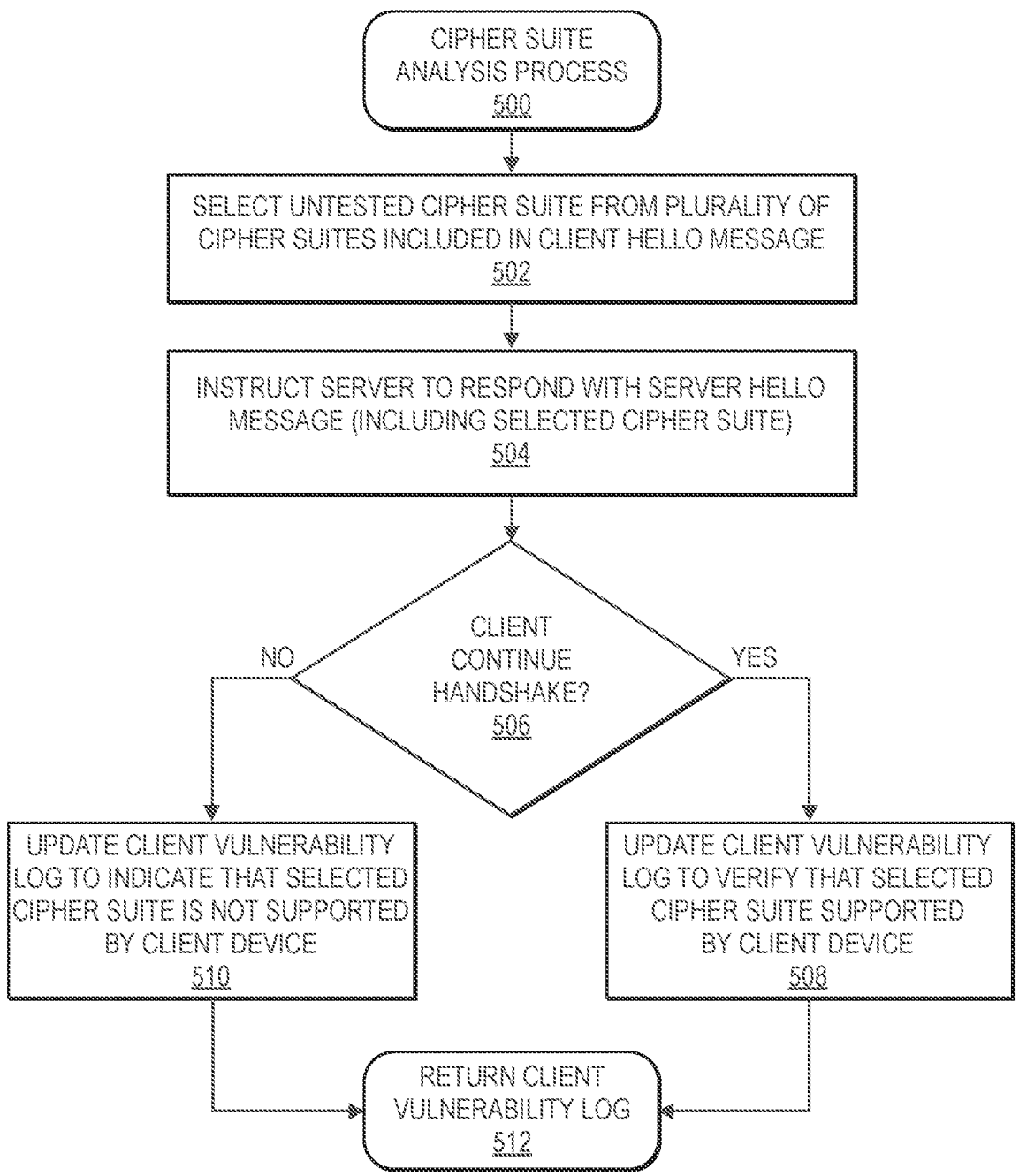
FIG. 5 is an example cipher suite analysis process, in accordance with described implementations.
Figure 6:
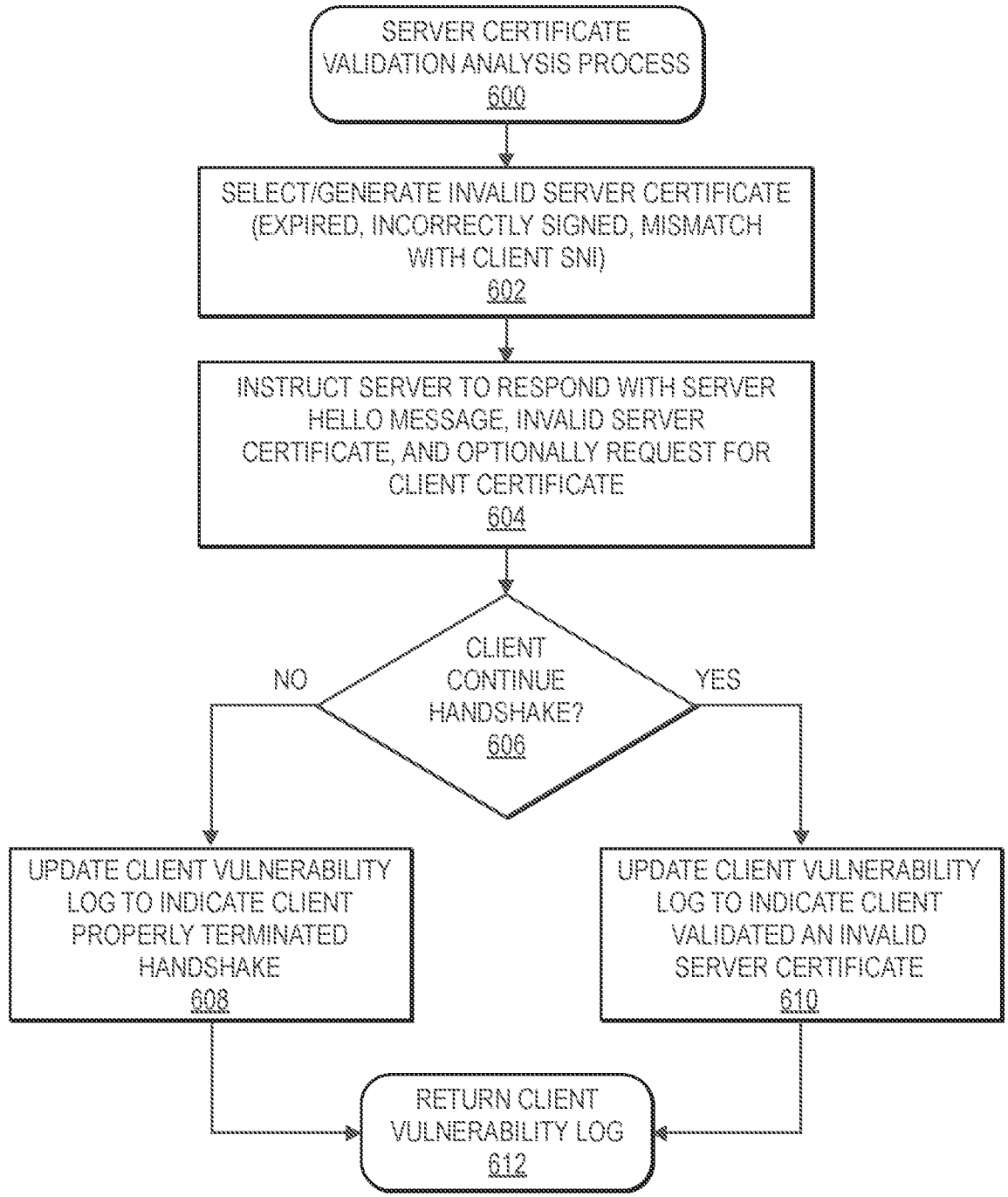
FIG. 6 is an example server certificate validation analysis process, in accordance with described implementations.

FIG. 5 is an example cipher suite analysis process 500, in accordance with described implementations. In addition to determining whether each of the cipher suites included in the plurality of cipher suites are supported cipher suites, as discussed above with respect to FIG. 4, the example process may be utilized to determine whether each of the listed cipher suites is actually supported by the client device. As noted above, if the client device is a device under test in a testing environment, the example process 500 may be repeated for each cipher suite included in the plurality of cipher suites as part of the testing. In comparison, if the client device is in a production environment and in use, the example process 500 may be performed each time the client device sends a hello message to connect to a server. In such a configuration, the example process 500 may maintain information as to which cipher suites have been analyzed, as confirmed as either actually supported by the client device or not supported by the client device and select an untested cipher suite each time the client device initiates a handshake.

The example process 500 begins by selecting an untested cipher suite from the plurality of cipher suites indicated in the client hello message, as in 502. For the selected cipher suite, the example process instructs the server to respond with a server hello message that includes the selected cipher suite, as in 504.

After the server sends the server hello message to the client device, a determination is made as to whether client continued the handshake, as in 506. As discussed above, detection of the presence of a sent client key exchange message and/or the client certificate from the client is confirmation that the client has continued the handshake. Because the client key exchange message may be encrypted, the example process 500 may only monitor for the presence or absence of the client key exchange message and/or the server certificate. In comparison, if the client either does not respond with a message (i.e., client key exchange message, client certificate) or if the client sends a closure alert closing the connection between the client device and the server, thereby terminating the handshake, it may be determined that the client did not continue the handshake.

If it is determined that the client continued the handshake, the client vulnerability log may be updated to verify that the selected cipher suite is supported by the client, as in 508. For example, if the client device responds with the client key exchange message and/or the client certificate after the server sends the server hello message with the selected cipher suite, such as message transmission by the client device is a confirmation that both the server and the client device have agreed upon the selected cipher suite. In comparison, if it is determined that the client key exchange message and/or client certificate is not sent/received, and/or that a closure alert was sent by the client, thereby indicating that the client device was not able to agree to the selected cipher suite (i.e., that the client device does not actually support the selected cipher suite), the client vulnerability log may be updated to indicate that the selected cipher suite is not supported by the client device, as in 510. For example, if the client device terminates the handshake in response to receipt of the server hello message with the selected cipher suite and a valid server certificate, the termination may be indicative of the client device not actually supporting the selected cipher suite. As noted above, in some instances, the client may provide a closure alert that indicates a reason for the handshake termination. In such an example, the closure alert may provide further confirmation that the client device does not support the selected cipher suite.

After updating the client vulnerability log to either verify that the client device does support the selected cipher suite (508) or that the client device does not support the selected cipher suite (510), the client vulnerability log may be returned to the example process 300 and the example process 500 may complete, as in 512.

FIG. 6 is an example server certificate validation analysis process 600, in accordance with described implementations.

The example process 600 begins by selecting or generating an invalid server certificate that is to be sent by the server to the client device as part of the handshake, as in 602. An invalid server certificate may be, for example, expired, incorrectly signed (e.g., not signed by a CA), include a common name ("CN") or subject alternative name ("SAN") that does not match the SNI included in the client hello message, etc.

The server may then be instructed to respond to the client hello message from the client device with a server hello message and the invalid server certificate, and optionally a request for a client certificate, as in 604. After sending the server hello message and the invalid server certificate, a determination may be made as to whether the client continued the handshake, as in 606. As noted above, it may be determined that the client has continued the handshake if a client key exchange message or a client certificate is sent from the client device to the server in response to the server hello message and the server certificate, and that such a transmission indicates that the client device has accepted the selected cipher suite and validated the server based on the received server certificate.

If it is determined that the client did not continue the handshake, meaning that the client device terminated the handshake in response to the invalid server certificate, the client vulnerable log may be updated to indicate that the client device properly terminated the handshake and did not validate the invalid server certificate, as in 608. As noted above, in some examples, the client device may send a closure alert that closes the connection between the client device and the server, thereby terminating the handshake. Still further, in such an example, the closure alert may include information as to why the handshake is terminated. In this example, the information may indicate that the client is terminating the handshake because of an invalid server certificate. In comparison, if it is determined that the client device continued the handshake, meaning that the client device validated the server based on an invalid server certificate, the client vulnerability log may be updated to indicate that the client device validated the server based on an invalid server certificate, as in 610.

Validation of a server based on an invalid server certificate presents a security risk to the client device because the invalid server certificate may be from an attacker and result, for example, in the client device being redirected to a malicious endpoint and the client device sending data to the attacker.

After updating the client vulnerability log to indicate that the client device properly did not validate the invalid server certificate (608) or that the client device improperly validated the invalid server certificate (610), the client vulnerability log may be returned to the example process 300 and the example process 600 may complete, as in 612.

As discussed above, the example process 600 may be performed to determine if the client device will validate a server based on an invalid server certificate. In some implementations, the server certificate validation analysis process 600 may only be performed in a testing environment for a device under test because if the client device is operating properly, in response to receipt of an invalid server certificate, the client device should terminate the handshake, for example by sending a closure alert message closing the connection between the client device and the server. However, in some implementations, the server certificate validation analysis process 600 may be performed for devices in production that are attempting to connect to the server. In such a scenario, if an invalid server certificate is sent to the client device and the client device responds correctly by terminating the handshake, when/if the client device attempts to reconnect, the example process 300 that determined that the server certificate validation analysis process 600 should be performed, may determine that the client device previously properly terminated the handshake in response to an invalid server certificate, based on the client vulnerability log, and determine that the server certificate validation analysis process 600 does not need to be again performed on the client device.

Figure 7:
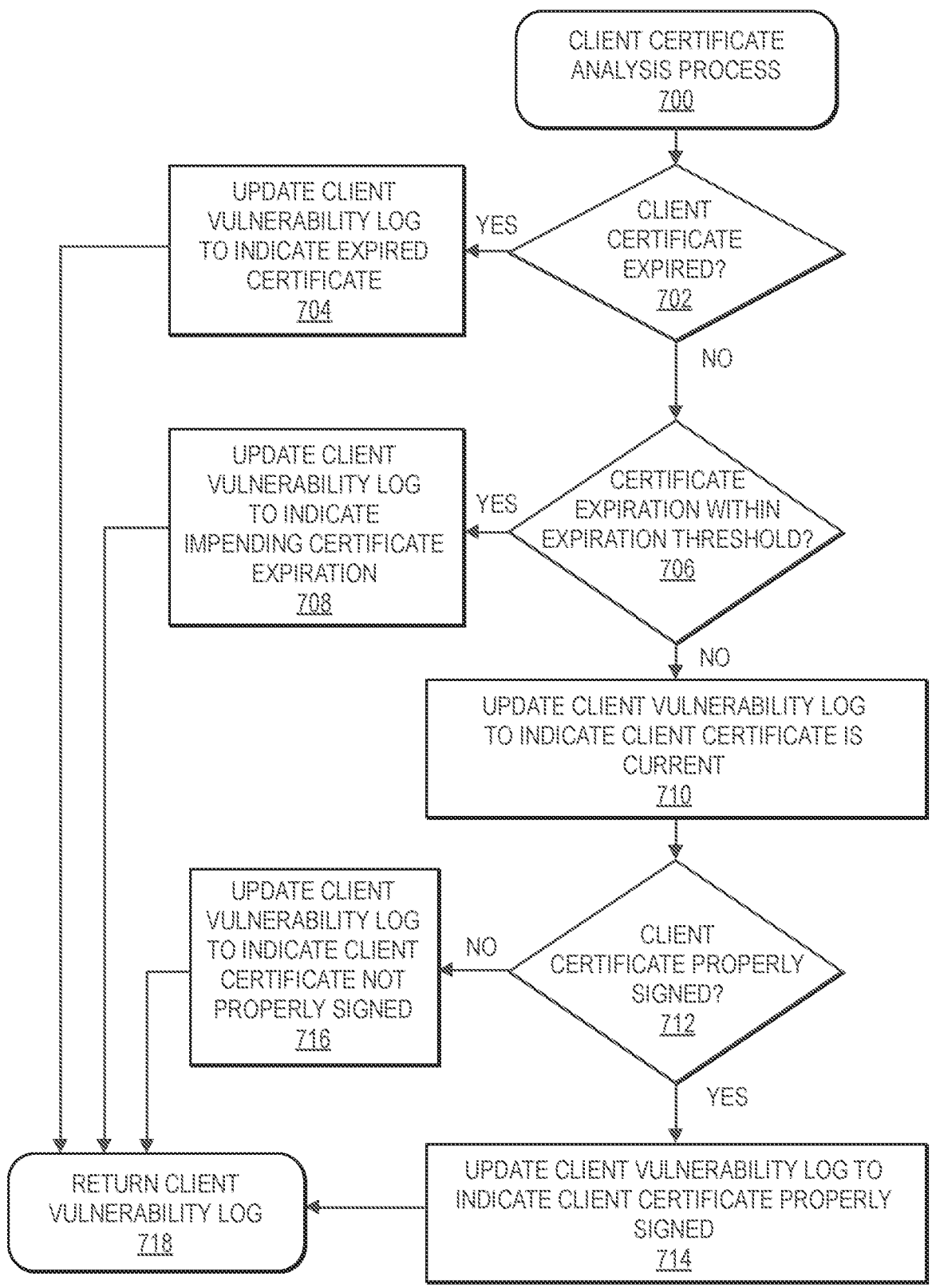
FIG. 7 is an example client certificate analysis process, in accordance with described implementations.

FIG. 7 is an example client certificate analysis process 700, in accordance with described implementations. As discussed above, if a client certificate request is not sent from the server to the client, the example process 300 may determine that the client certificate analysis 700 is not to be performed.

The example process 700 begins by determining if the client certificate is expired, as in 702. If it is determined that the client certificate is expired, the client vulnerability log is updated to indicate that the client certificate is expired, as in 704. If it is determined that the client certificate is not expired, a determination is made as to whether the client certificate is going to expire within an expiration threshold, as in 706. The expiration threshold may be any value or time duration for determining if a client certificate is approaching expiration. For example, the expiration threshold may be five days, two weeks, one month, etc. The expiration threshold may vary for different client devices, different types of client devices, different servers, etc.

If it is determined that the client certificate is within the expiration threshold, the example process 700 may update the client vulnerability log to indicate that the client certificate is within the expiration threshold (i.e., about to expire), as in 708. If it is determined at decision block 706 that the client certificate is not within the expiration threshold, the client vulnerability log may be updated to indicate that the client certificate is current, as in 710.

After updating the client vulnerability log to indicate that the client certificate is expired, within the expiration threshold, or current, a determination is made as to whether the client certificate is properly signed, as in 712. Similar to the server certificate, the client certificate may be signed by a CA, signed with a signature provided by the server, self-signed, etc. If it is determined that the client certificate is properly signed, the client vulnerability log may be updated to indicate that the client certificate is properly signed, as in 714. In comparison, if it is determined that the client certificate is not properly signed, the client vulnerability log may be updated to indicate that the client certificate is not properly signed, as in 716.

After updating the client vulnerability log to indicate that the client certificate is properly signed or not properly signed, the example process 700 returns the client vulnerability log to the example process 300 and the example process 700 completes, as in 718.

Figure 8:
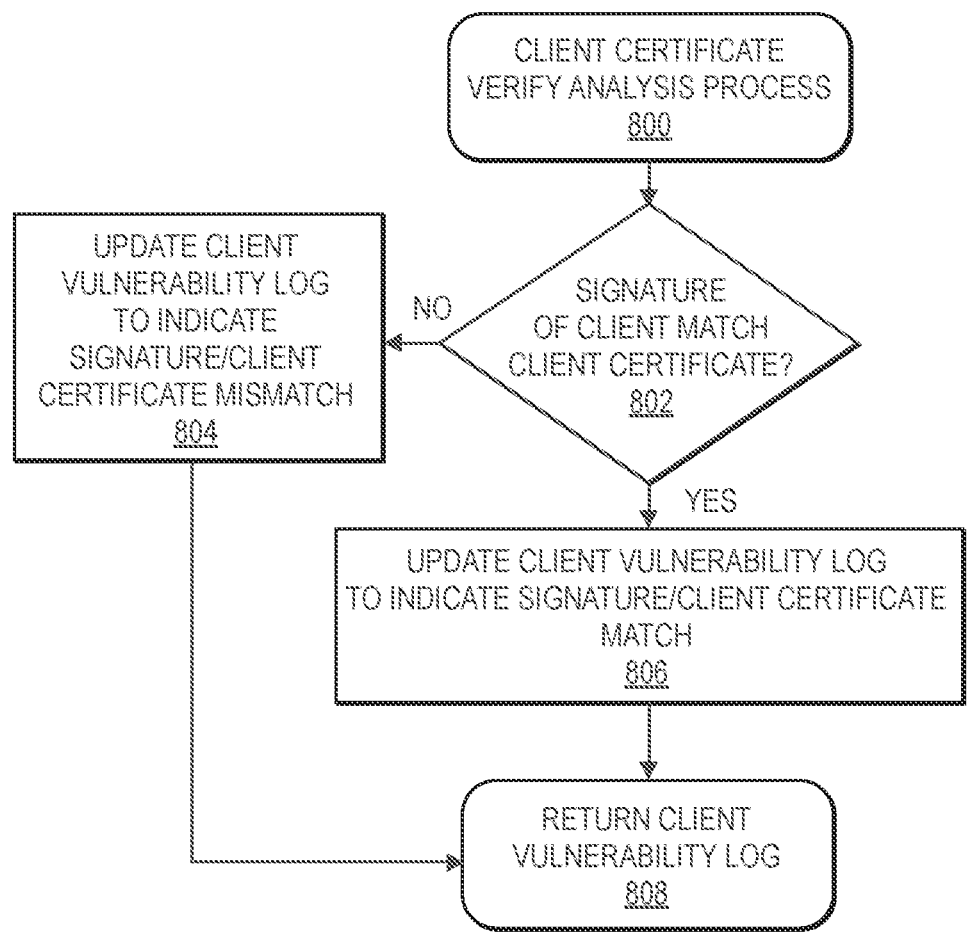
FIG. 8 is an example certificate verify analysis process, in accordance with described implementations.

FIG. 8 is an example client certificate verify analysis process 800, in accordance with described implementations.

The example process 800 begins by determining if the signature of the client device that was used to digitally sign the received client verify message (block 322, FIG. 3) matches the client certificate, as in 802. The certificate verify message is used by the client device to prove to the server that the client device possesses the client private key corresponding to the client public key. For example, the client public key included in the client certificate and/or the other metadata included in the client certificate may be used to verify the client signature of the certificate verify message.

If it is determined that the signature does not match the client certificate, the client vulnerability log is updated to indicate that the digital signature used to sign the certificate verify message does not match the client certificate, as in 804. In comparison, if it is determined that the digital signature does match the client certificate, the client vulnerability log may be updated to indicate that the digital signature and the client certificate match, as in 806.

After updating the client vulnerability log to indicate that the digital signature either matches the client certificate (806) or does not match the client certificate (a vulnerability) (804), the client vulnerability log is returned to the example process 300 and the example process 800 completes, as in 808.

Figure 9A:
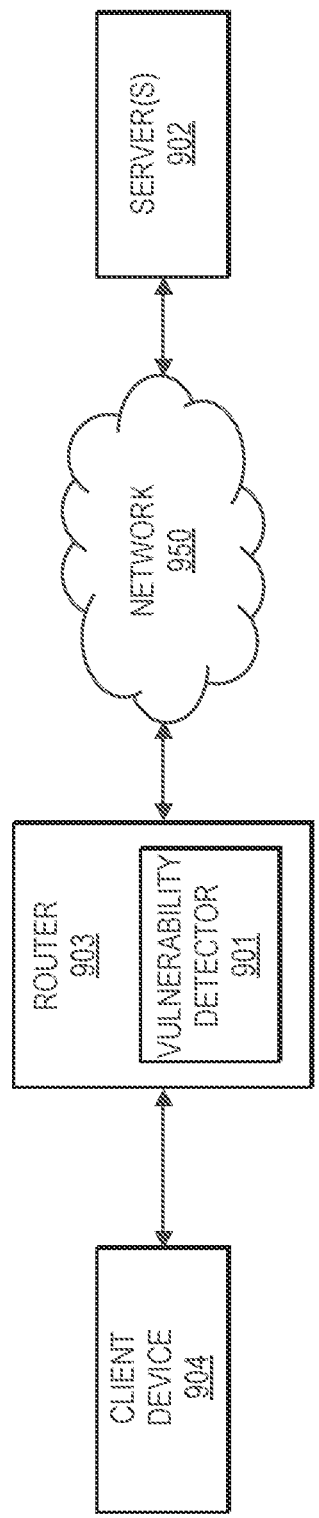
FIGS. 9A and 9B are block diagrams of example network connections between a client device, a server, and a vulnerability detector, in accordance with described implementations.
Figure 9B:
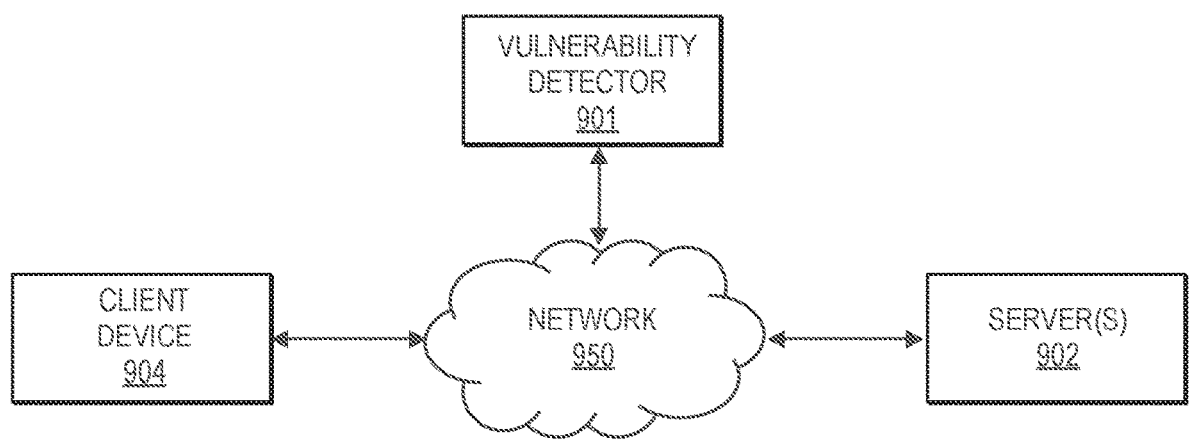

FIGS. 9A and 9B are block diagrams of example network connections between a client device 904, a server 902, and a vulnerability detector 901, in accordance with described implementations.

As illustrated and as discussed above, a client device 904 may be any device that connects to a network 950, such as the Internet, to establish an encrypted communication with one or more servers 902. Example client devices are discussed above with respect to FIGS. 1A and 1B.

Similar to the above examples, the client device 904 communicates with a server 902 through a connection over a network 950, such as the Internet, an intranet, wide area network, local area network, direct connection, etc. In comparison to the example discussed with respect to FIGS. 1A and 1B, in the configuration illustrated in FIG. 9A, the vulnerability detector 901 is positioned between network 950 and the client device 904 and is independent of the server 902. For example, the vulnerability detector 901 may be included in a firewall, router 903, or other form of gateway to the client device 904. In other implementations, such as illustrated in FIG. 9B, the vulnerability detector may be independent of both the client device 904 and the server(s) 902 and configured to receive handshake messages via the network 950 as those messages are sent between the client device 904 and the server 902. In either of the example configurations illustrated in FIGS. 9A and 9B, the vulnerability detector 901 is not able to send commands and/or instructions to the sever 902 and may only receive, access, or otherwise observe handshake messages sent over the network 950 and between the client device 904 and the server 902.

Figure 10:
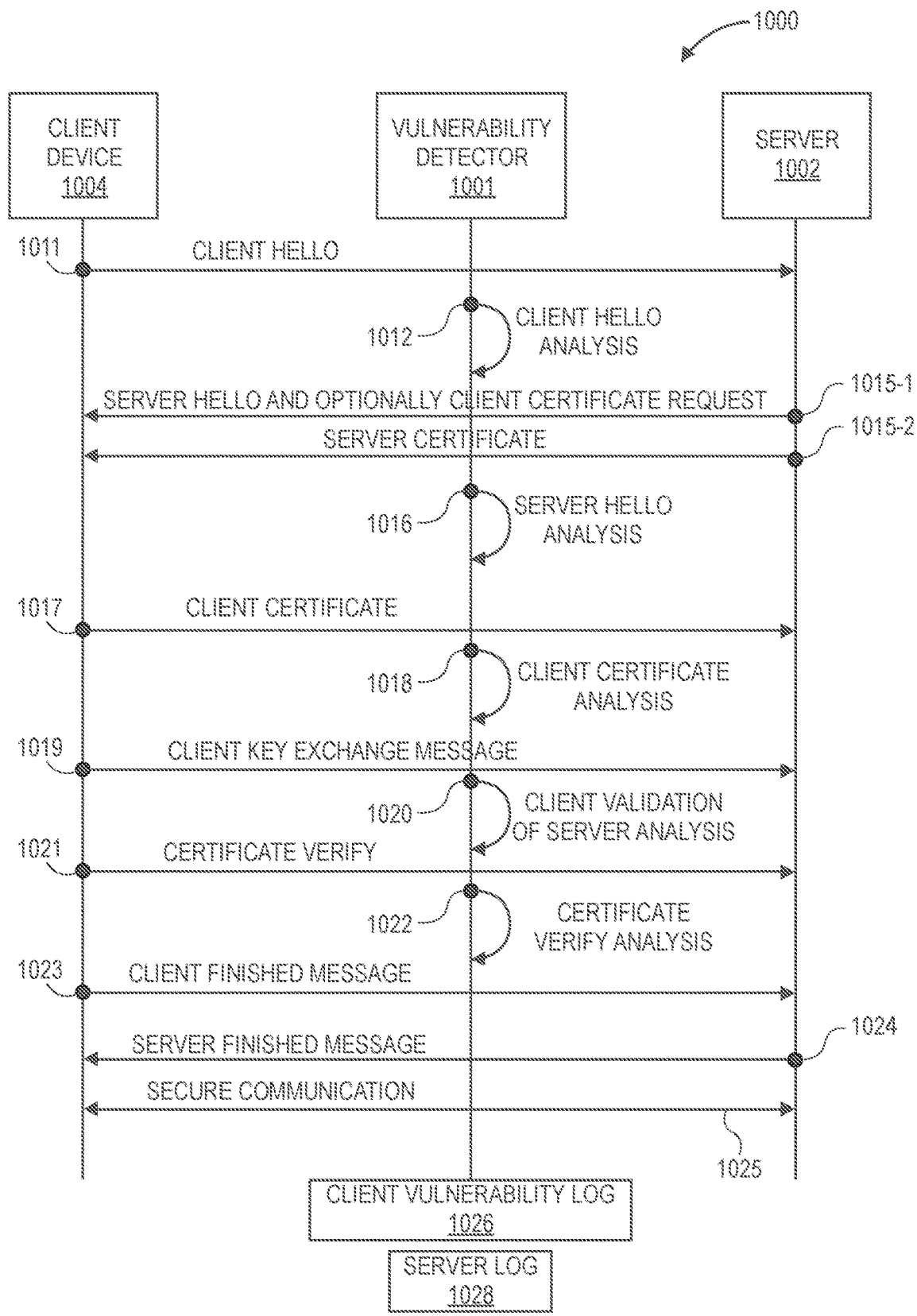
FIG. 10 is another transition diagram of a handshake, such as a TLS handshake, between a client device and a server, including analysis of unencrypted messages of the handshake by a vulnerability detector, in accordance with described implementations.

FIG. 10 is another transition diagram 1000 of a handshake, such as a TLS handshake, between a client device 1004 and a server 1002, including analysis of unencrypted messages of the handshake and/or detect the presence or absence of encrypted portions of the handshake by a vulnerability detector 1001, in accordance with described implementations.

As is typical for a handshake, such as a TLS handshake, at 1011 a client hello message, which is unencrypted, is sent from the client device 1004 to the server 1002. The client hello message may contain one or more of a protocol version indicating a version of a protocol, such as the TLS protocol version supported by the client device, a random string of data, referred to herein as a client random, an indication of a plurality of algorithm suites supported by the client device, also referred to herein as cipher suites, compressions methods used by the client device 1004, and optionally a SNI indicating an endpoint to which the client device intends to connect. In some implementations, a client device time may also be included in the client hello message.

As illustrated, at 1012 the vulnerability detector 1001 may receive access to the client hello message sent from the client device 1004 to the server 1002 and perform a client hello analysis on the client hello message. As discussed above with respect to FIG. 4, analysis of the client hello message may be used to determine if the client device is using a current protocol version, such as a current TLS protocol version. Likewise, the analysis of the client hello message may be used to determine if one or more cipher suites in the indicated plurality of cipher suites are unsupported cipher suites. Finally, analysis of the client hello message may be used to determine if the client random is random, and/or if the client device time, if included, is correct. If it is determined that any one of the protocol version supported by the client device is not current, one or more of the indicated plurality of cipher suites is not supported, that the client random is not random, and/or that the client device time is incorrect, a client vulnerability log for the client device may be updated to indicate the determined vulnerability.

In response to the client hello message, at 1015-1 the server 1002 sends a server hello message, which is unencrypted and includes selection of a cipher suite. In addition, the server 1002 may optionally send a client certificate request that the client provide a client certificate as part of the handshake. In addition, at 1015-2, in response to the client hello message, the server sends a server certificate. As discussed above, the server hello message, server certificate, client certificate request may be sent as part of a single message, multiple messages, or each sent as an individual message.

At 1016, the vulnerability detector 1001 may receive and/or otherwise access the server hello message 1015 and analyze the server hello message to determine which cipher suite was selected by the server, whether the server certificate is valid, and whether the client certificate request was included in the server hello message. Analysis of the server hello message is discussed further below with respect to FIG. 12 and may be used to produce a server log 1018, as discussed below.

At 1017, if a client certificate request is sent from the server 1002 to the client, the client, provided it supports the selected cipher suite and verifies the server based on the server certificate included in the server hello message, sends a client certificate. At 1018, the vulnerability detector receives or accesses the client certificate and performs a client certificate analysis. As discussed above with respect to FIG. 7, the client certificate analysis 1018 may determine if the client certificate is expired or about to expire.

In addition to optionally sending the client certificate, in response to the server hello message, the client 1004 sends, at 1019, a client key exchange message. In some instances, the client key exchange message may be encrypted with the server public key, which is determined from the server certificate. In other implementations, the client key exchange message may not be encrypted. As discussed further below, based on the server certificate sent from the server and detection of the client key exchange message sent from the client device and/or the client certificate sent from the client device, it may be determined at 1020 whether the client device 1004 improperly validated the server based on an invalid server certificate.

At 1021, the client may also send a certificate verify message that is digitally signed with a signature of the client device 1004. The vulnerability detector, upon receiving the certificate verify message, at 1022 may analyze the certificate verify message and determine, based at least in part on the client certificate, whether the digital signature used to sign the certificate verify message corresponds to the client device 1004.

Finally, at 1023 the client device 1004 may send a client finished message and at 1024 the server 1002 may send a server finished message indicating that each has completed the handshake and computed an encryption key that may be used by each of the client device 1004 and the server 1002 to encrypt messages sent between the client device 1004 and the server 1002, thereby, at 1025, establishing a secure communication between the client device 1004 and the server 1002.

As the vulnerability detector analyzes the unencrypted messages of the handshake and/or detects the presence or absence of encrypted messages of the handshake, detected vulnerabilities may be included in a client vulnerability log 1026. Upon completion of the handshake, the client vulnerability log 1026 and/or the server log 1028 may be provided to cause the vulnerabilities to be resolved. For example, the client vulnerability log 1026 may be provided to an agent that is associated with the client device to indicate the detected vulnerabilities.

In some implementations, the vulnerability detector may be configured to send messages to the client device and/or have the ability to terminate the handshake between the client device and the server. In such an implementation, as discussed further below, if the vulnerability detector 1001 detects a vulnerability in the handshake, it may cause the handshake to be terminated, thereby protecting both the client device and the server from potential malicious activity. In addition, a client vulnerability log 1026 and/or the server log 1028 may be provided that indicates the detected vulnerability.

FIGS. 11A through 11D is another example of a vulnerability analysis process 1100, in accordance with described implementations.

Figure 11A:
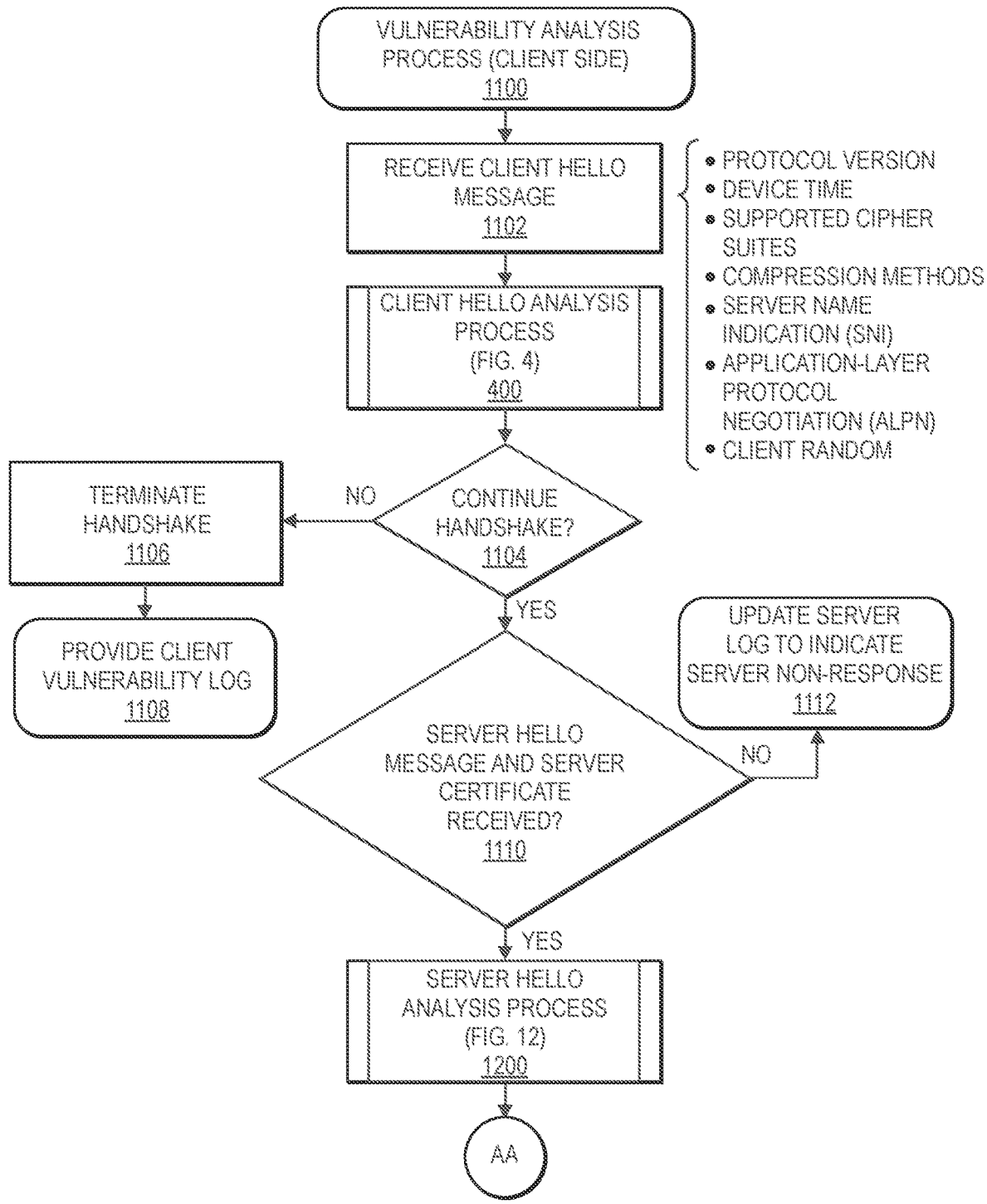
FIGS. 11A through 11D is another example of a vulnerability analysis process, in accordance with described implementations.

Referring first to FIG. 11A, the example process begins upon receipt of a client hello message sent from a client device to a server, as in 1102. The client hello message is unencrypted and may include one or more of a protocol version, such as a TLS protocol version to be used, a client random, an indication of a plurality of cipher suites supported by the client device (which may be indicated or listed in an order of preference to the client device), compression methods supported by the client device, optionally a SNI to which the client device is requesting to connect, and/or optionally an ALPN indicating the application protocol to be used. The client hello message may also contain a client device time.

Upon receipt of the client hello message, a client hello analysis process 400 may be performed to determine any client vulnerabilities that are detectable from the client hello message. For example, and as discussed above with respect to FIG. 4, the client hello analysis process 400 may process the client hello message to determine if the protocol version of the client is out of date, if one of the indicated cipher suites in the plurality of cipher suites is unsupported, if the client random is not random, and/or if the client device time is incorrect.

Upon completion of the client hello analysis process 400, a determination may be made as to whether the handshake between the client device and the server is to continue, as in 1104. For example, it may be determined that the handshake is not to continue if one or more client device vulnerabilities were determined from the client hello analysis process. For example, if it is determined that the protocol indicated in the client hello message for use is out of date and therefore the client device is potentially vulnerable to a security attack by a third party, to protect the server and the client device, it may be determined that the handshake is not to continue.

If it is determined that the handshake is not to continue, the handshake is terminated, as in 1106, and a client vulnerability log is provided to cause the determined client device vulnerabilities to be resolved, as in 1108. For example, the example process 1100 executing on a vulnerability detector may send a handshake termination message to one or both of the client device and/or the server that will cause the handshake to terminate.

As discussed, the client vulnerability log may include an indication of each client vulnerability determined from the example process 1100 and may be sent to an agent responsible or associated with the client device to inform the agent of the determined client device vulnerabilities so those vulnerabilities may be resolved. In other examples, the client vulnerability log may also or alternatively be provided to the server and/or another service that is operable to connect to the client device and cause the vulnerabilities to be resolved. For example, the server and/or another service may be operable to connect to the client device and update the protocol version supported by the client device, update a list of cipher suites supported by the client device, reset or adjust the device time of the client device to correspond to a desired time, such as a global clock, update the client device to provide random data as the client random, etc.

Returning to FIG. 11A, if it is determined at decision block 1104 that the handshake is to continue, a determination is made as to whether a server hello message, which optionally includes a client certificate request, and/or a server certificate has been received from the server in response to the client hello message, as in 1110. If it is determined that a server hello message and/or server certificate has not been received, a server log corresponding to the server indicated in the client hello message is updated to indicate that the server is non-responsive, as in 1112. In some examples, if the server is terminating the handshake, a closure alert may be sent from the server indicating a reason for the handshake termination. Such information may be included in the server log. In other examples, if the server is non-operable (e.g., powered down) or otherwise unavailable, it may be non-responsive.

If it is determined that the server hello message and/or server certificate has been received, the server hello analysis process 1200 (FIG. 12A) is performed. As discussed further below with respect to FIG. 12A, the server hello analysis process may determine, among other information, a cipher suite from the plurality of cipher suites selected by the server and whether the server certificate is valid (e.g., properly signed, not expired, subject names match SNI). The server hello analysis process 1200 is discussed further below with respect to FIG. 12A.

Figure 11B:
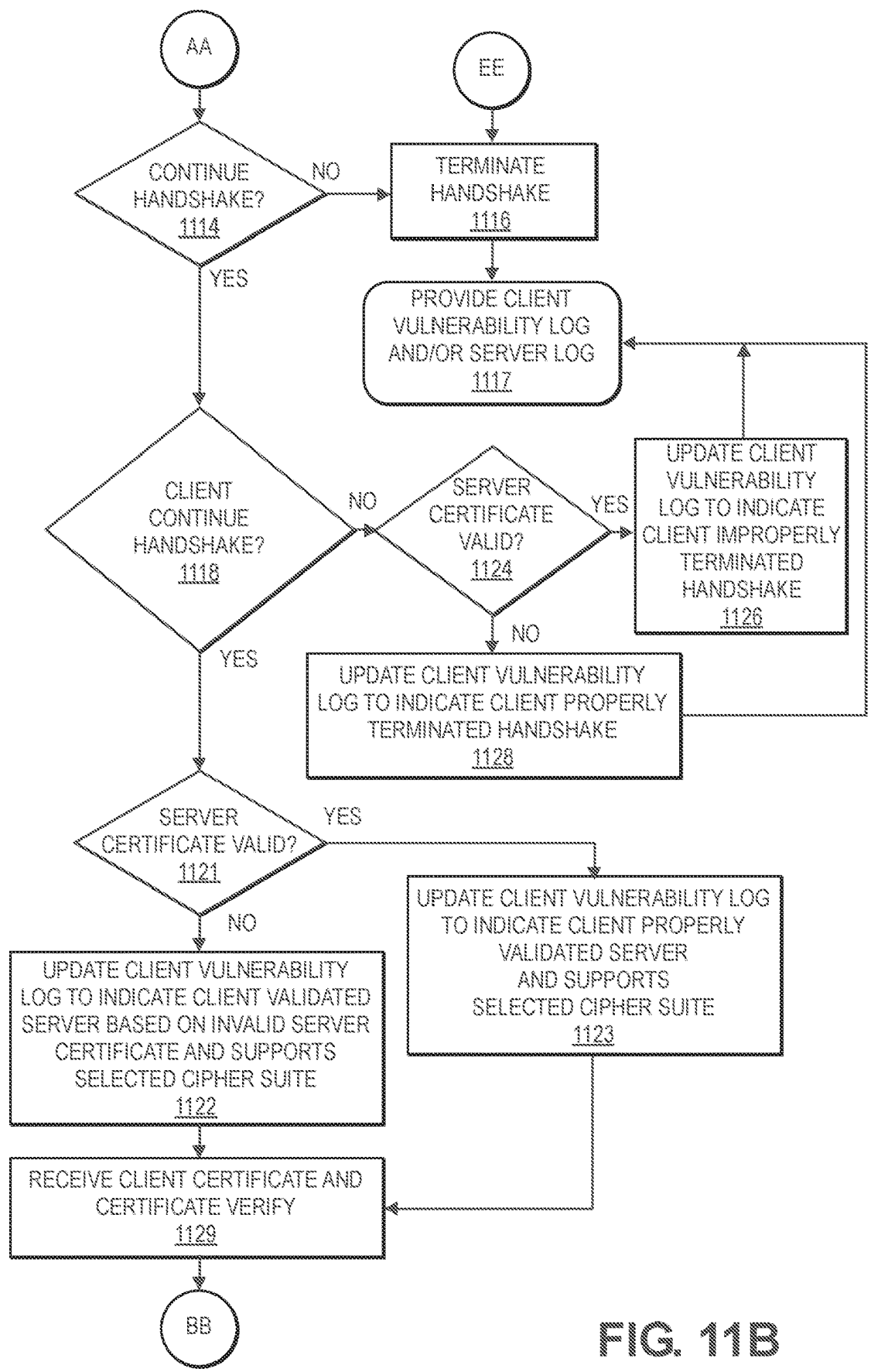

Upon completion of the server hello analysis process 1200, a determination is made as to whether the handshake is to continue, as in 1114 (FIG. 11B). For example, it may be determined that the handshake is not to continue if one or more vulnerabilities were determined from the server hello analysis process (1200). For example, if it is determined that the server certificate is invalid and/or that an unsupported cipher suite has been selected by the server, to protect the server and the client device, it may be determined that the handshake is not to continue.

If it is determined that the handshake is not to continue, the handshake is terminated, as in 1116, and a client vulnerability log and/or server log is provided to cause the determined client device vulnerabilities and/or the server vulnerabilities to be resolved, as in 1117. For example, the example process executing on a vulnerability detector may send a handshake termination message to one or both of the client device and/or the server that will cause the handshake to terminate. In some implementations, there may be no detected client vulnerabilities, but the handshake may have been terminated in response to detection of an invalid server certificate included in the server hello message. In such an example, the server log, which identifies the invalid server certificate, may be provided to the client device as an indication as to why the handshake was terminated and/or provided to the server for resolution of the determined vulnerability(s).

If it is determined at decision block 1114 that the handshake is to continue, a determination is made as to whether the client continued the handshake, as in 1118. It may be determined that the client continued the handshake if the client key exchange message is received from the client device and/or if a client certificate is received from the client device (if a client certificate request was sent from the server). In some implementations, the client key exchange message may be encrypted with the server public key. In other implementations, the client key exchange message may not be encrypted. The client key exchange message is sent according to the cipher suite selected by the server in the server hello message and is used to generate a master secret from which both the client device and the server will derive the final cryptographic keys required to establish the encrypted communication between the client device and the server.

If it is determined that the client did not continue the handshake in response to the server hello message that was detected at decision block 1110, a determination is made as to whether the server certificate sent from the server was valid, as in 1124. If it is determined that the server certificate was valid, the client vulnerability log is updated to indicate that the client device improperly terminated the handshake, as in 1126. In some implementations, the client vulnerability log may also be updated to indicate that the improper termination may be a result of the cipher suite selected by the server from the plurality of cipher suites included in the client hello message not actually being supported by the client device. As noted above, in some instances the client device may provide a closure alert closing the connection and terminating the handshake. Such a closure alert may indicate why the client has not continued the handshake and such information may be included in the client vulnerability log.

If it is determined at decision block 1124 that the server certificate was not valid, the client vulnerability log may be updated to indicate that the client device properly terminated the handshake in response to receipt of the invalid server certificate, as in 1128.

After updating the client vulnerability log to indicate that the client device improperly terminated the handshake (1126) or to indicate that the client device properly terminated the handshake in response to receiving an invalid server certificate (1128), the example process 1100 proceeds to block 1117.

Returning to decision block 1118, if it is determined that the client key exchange message encrypted with the server public key is received, a determination is made as to whether the server certificate included in the server hello message was valid, as in 1121. If it is determined that the server certificate is valid, the client vulnerability log may be updated to indicate that the client device properly validated the server and supports the cipher suite selected by the server, as in 1123. If it is determined that the server certificate is invalid, the client vulnerability log may be updated to indicate that the client device validated a server based on an invalid server certificate and may also be updated to indicate that the client device does support the cipher suite selected by the server, as in 1122.

If the server hello message included a client certificate request, the client certificate and a certificate verify message sent from the client device to the server are also received, as in 1129. If a client certificate request was not included in the server hello message, blocks 1129, 1130, 700, 1132, 1134, 800, and 1135 may be omitted from the example process 1100.

Figure 11C:
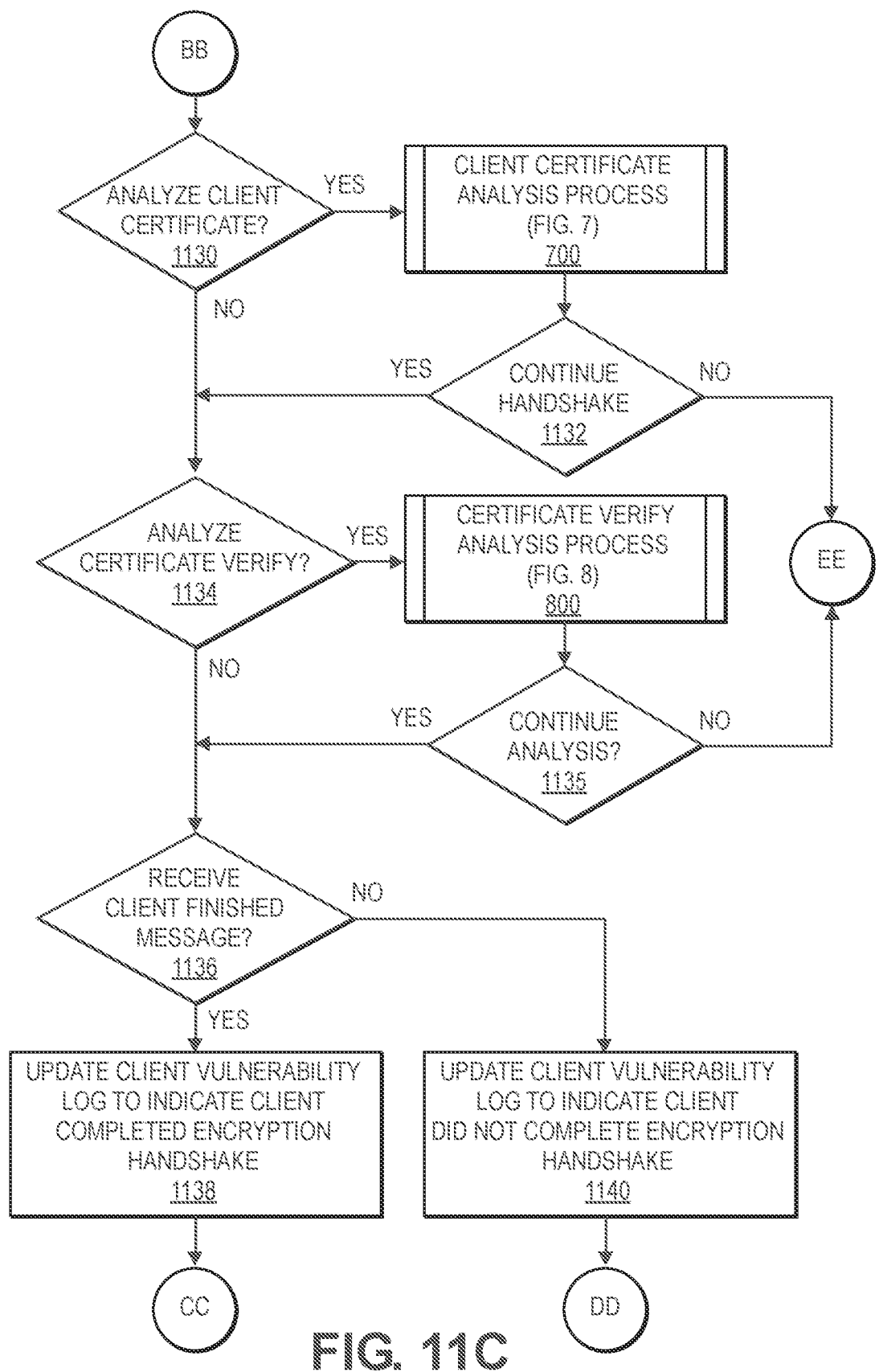

In response to receiving the client certificate, a determination is made as to whether the client certificate is to be analyzed, as in 1130 (FIG. 11C). If it is determined that the client certificate is to be analyzed, the client certificate analysis process is performed, as in 700. The client certificate analysis process is discussed above with respect to FIG. 7. Upon completion of the client certificate analysis process 700, a determination may be made as to whether the handshake is to continue, as in 1132. If it is determined at decision block 1132 that the handshake is not to continue, the example process 1100 returns to block 1116 and continues. If it is determined at decision block 1132 that the handshake is to continue, or if it is determined at decision block 1130 that the client certificate is not to be analyzed, a determination is made as to whether the certificate verify message received from the client device is to be analyzed, as in 1134. If it is determined that the certificate verify message is to be analyzed, the certificate verify analysis process 800 (FIG. 8) is performed. As discussed above with respect to FIG. 8, the certificate verify analysis process 800 may determine if the signature of the client matches the client certificate.

After completion of the certificate verify analysis process 800, a determination is made as to whether the handshake is to continue, as in 1135. For example, it may be determined that the handshake is not to continue if the signature on the certificate verify message does not match the client certificate.

If it is determined at decision block 1135 that the handshake is not to continue, the example process returns to block 1116 and continues. If it is determined that the handshake is to continue at decision block 1135 or if it is determined at decision block 1134 that the certificate verify message is not to be analyzed, a determination is made as to whether a client finished message sent from the client device to the server has been received, as in 1136. The client finished message, which is encrypted with the session key generated through the handshake, indicates to the server that the client has completed the handshake, has generated the session key, and is ready to begin exchange of encrypted data.

If it is determined that the client finished message is not received, the client vulnerability log may be updated to indicate that the client did not complete the handshake, as in 1140. In comparison, if it is determined that the client finished message is received, the client vulnerability log may be updated to indicate that the client finished the handshake, as in 1138.

Figure 11D:
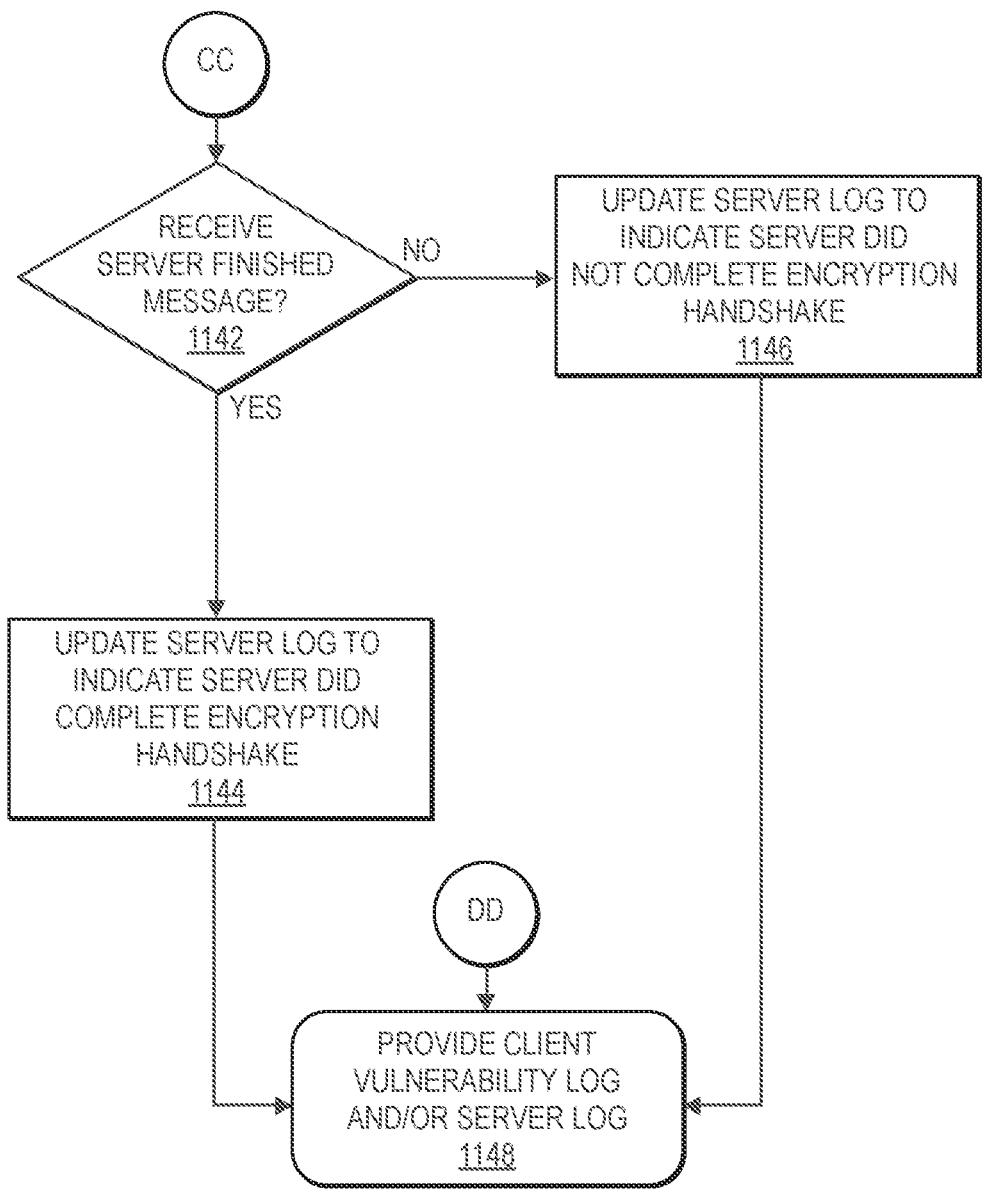

Turning now to FIG. 11D, after determining that the client finished message has been received at decision block 1138, a determination may be made as to whether a server finished message sent from the server to the client has been received, as in 1142. Like the client finished message, the server finished message, which is encrypted with the session key generated through the handshake, indicates to the client that the server has completed the handshake, has generated the session key, and is ready to begin exchange of encrypted data.

If it is determined that the server finished message has been received, the server log is updated to indicate that the server completed the handshake, as in 1144. In comparison, if it is determined that the server finished message was not received, the server log may be updated to indicate that the server did not complete the handshake, as in 1146.

Finally, after updating the server finished log to indicate that the server finished the handshake (1144) or did not finish the handshake (1146), or after updating the client vulnerability log to indicate that the client did not finish the handshake (1140), the client vulnerability log and/or server log may be provided to cause the determined client device vulnerabilities and/or server vulnerabilities to be resolved, as in 1148.

As discussed, the client vulnerability log may include an indication of each client vulnerability determined from the example process 1100 and may be sent to an agent responsible or associated with the client device to inform the agent of the determined client device vulnerabilities so those vulnerabilities may be resolved. In other examples, the client vulnerability log may also or alternatively be provided to the server and/or another service that is operable to connect to the client device and cause the vulnerabilities to be resolved. For example, the server and/or another service may be operable to connect to the client device and update the protocol version supported by the client device, update a list of cipher suites supported by the client device, reset or adjust the device time of the client device to correspond to a desired time, such as a global clock, update the client device to provide random data as the client random, update the client certificate if it is expired or about to expire, etc. Likewise, the server log may be provided to the agent, client device, and/or server to indicate additional information about the server determined during the analysis of the handshake between the client and the server. Such information may be used to update the server, if sent to the server or an agent associated with the server. Alternatively, or in addition thereto, the server log may be used to indicate the server as a potentially malicious server or a known safe server, if the server log is sent to the client device or an agent associated with the client device.

Figure 12A:
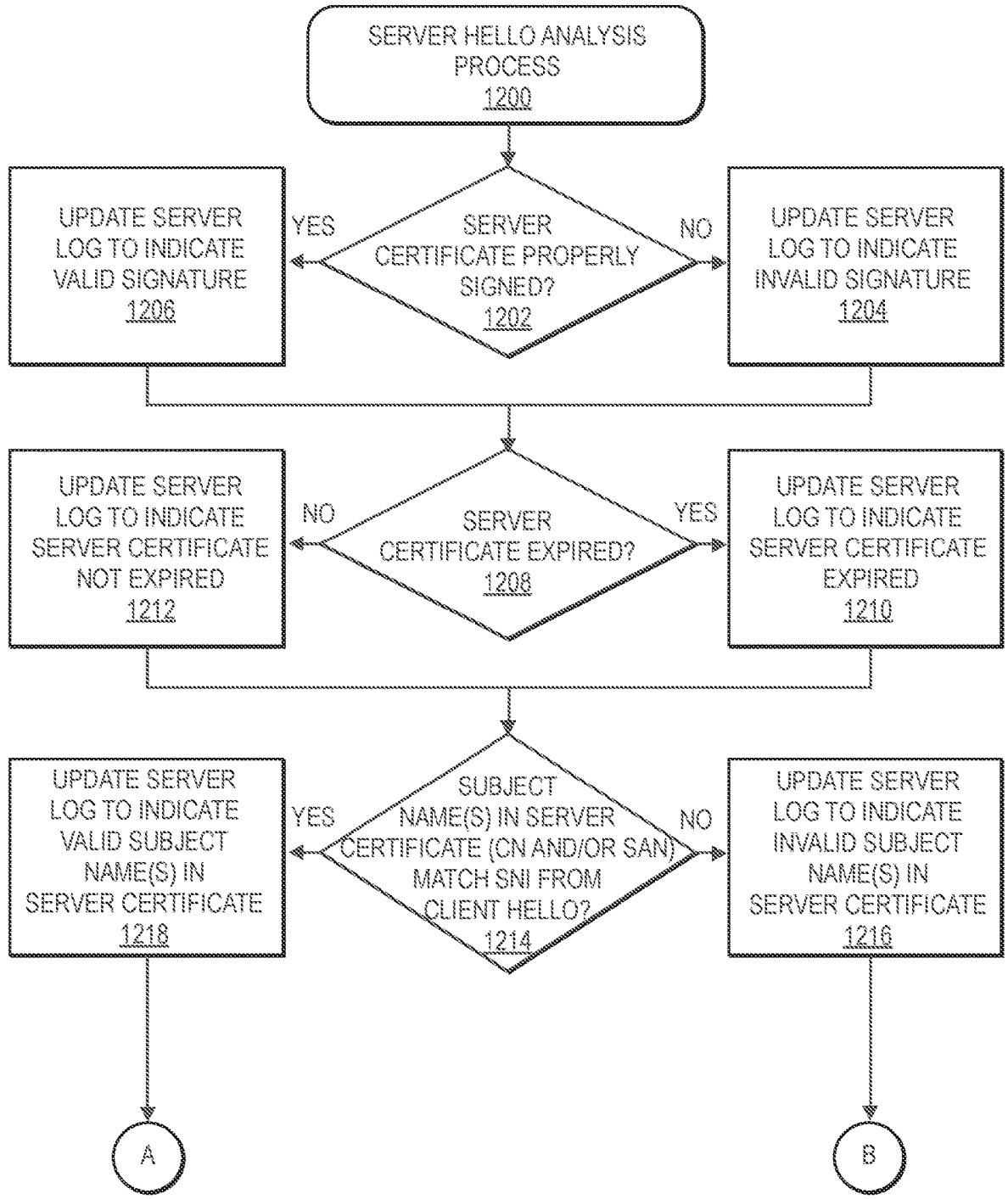
FIG. 12A through 12B is an example server hello analysis process, in accordance with described implementations.

FIG. 12A is an example server hello analysis process 1200, in accordance with described implementations.

The example process 1200 begins by determining if the server certificate is properly signed, as in 1202. For example, in some implementations, the server certificate, to be considered properly signed, must be signed by a CA. If the server certificate is self-signed or signed by anyone other than a CA, it may be determined that the server certificate is not properly signed. If it is determined that the server certificate is properly signed, the server log may be updated to indicate that the server certificate has a valid signature, as in 1206. If it is determined that the server certificate is not properly signed, the server log may be updated to indicate that the server certificate has an invalid signature, as in 1204.

The example process 1200 also determines if the server certificate is expired, as in 1208. Server certificates have an expiration date and if the expiration date is beyond the current date of which the analysis is performed, it may be determined that the server certificate has expired. If it is determined that the server certificate has expired, the server log may be updated to indicate that the server certificate is expired, as in 1210. If it is determined that the server certificate has not expired, the server log may be updated to indicate that the server certificate has not expired, as in 1212.

The example process 1200 may also determine if the subject name(s) included in the server certificate, such as the CN and/or SAN, match the SNI included in the client hello message, as in 1214. If it is determined that the subject names in the server certificate do not match the SNI included in the client hello message, the server log may be updated to indicate that the subject name(s) included in the server certificate do not match the SNI name included in the client hello message, as in 1216. If it is determined that the subject name(s) in the server certificate do match the SNI included in the client hello message, the server log may be updated to indicate that the server certificate subject name(s) match the SNI of the client hello message, as in 1218.

As discussed herein, determination of any one or more of the server certificate including an invalid signature, the server certificate being expired, and/or the subject name(s) in the server certificate not matching the SNI in the client hello message may result in a determination that the server certificate is invalid.

Figure 12B:
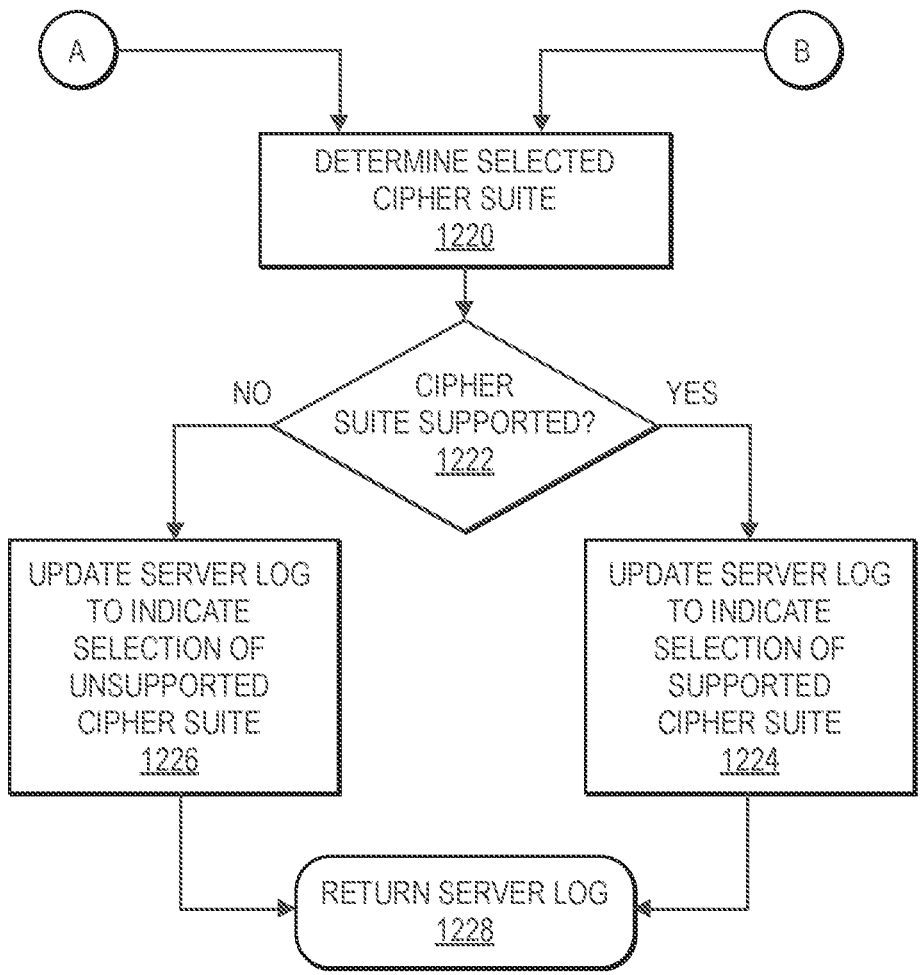

Turning to FIG. 12B, the example process 1200 may also determine the cipher suite selected by the server and included in the server hello message, as in 1220. Based on the selected cipher suite, a determination may be made as to whether the selected cipher suite is a supported cipher suite, as in 1222. For example, the selected cipher suite may be compared with a list of supported cipher suites to determine if the cipher suite is supported. As discussed above, a list of supported cipher suites may be maintained by a community or entity(s) that maintains the protocol, such as the TLS protocol, and made available to those using the protocol.

If it is determined that the cipher suite selected by the server is supported, the server log may be updated to indicate that the cipher suite selected by the server is a supported cipher suite, as in 1224. If it is determined that the selected cipher suite is unsupported, the server log may be updated to indicate that the server selected an unsupported cipher suite, as in 1226.

Finally, after updating the server log at block 1224 or 1226, the server log may be returned to the example process 1100 and the example process 1200 may complete, as in 1228.

While the example discussed with respect to FIGS. 12A and 12B illustrates the determinations discussed at decision blocks 1202, 1208, 1214, and 1222 being performed in a sequential or serial order, it will be appreciated that the determinations discussed with respect to FIGS. 12A and 12B may be performed in any order and/or some or all of the determinations may be performed in parallel.

Figure 13:
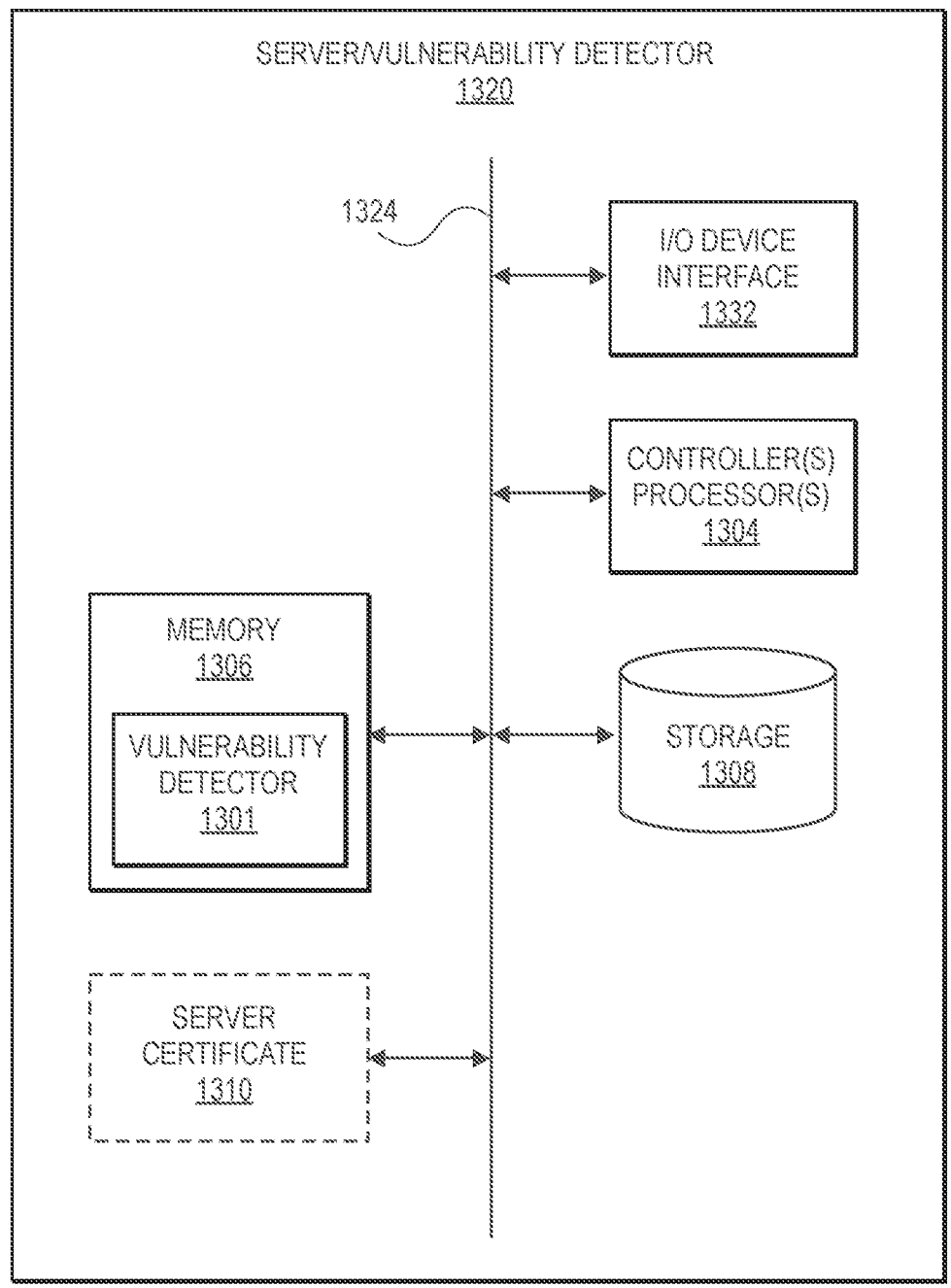
FIG. 13 illustrates example components of a server or a stand-alone vulnerability detector, in accordance with described implementations.

FIG. 13 illustrates example components of a server or a stand-alone vulnerability detector, collectively the server/vulnerability detector 1320, in accordance with described implementations. The components illustrated in FIG. 13 may also be representative of any other device in which the vulnerability detector may be included, such as a router, firewall, or other gateway, as illustrated in FIG. 9A. In operation, the server/vulnerability detector 1320 may include computer-readable and computer-executable instructions that reside on the server/vulnerability detector 1320, as will be discussed further below.

The server/vulnerability detector 1320 may include one or more controllers/processors 1304, that may include a central processing unit (CPU) for processing data and computer-readable instructions, and a memory 1306 for storing data and instructions of the respective device. The memories 1306 may individually include volatile random-access memory (RAM), non-volatile read only memory (ROM), non-volatile magnetoresistive (MRAM) and/or other types of memory. The server/vulnerability detector 1320 may also include a data storage component 1308, for storing data and controller/processor-executable instructions. The data storage component 1308 may include one or more non-volatile storage types such as magnetic storage, optical storage, solid-state storage, etc. The server/vulnerability detector 1320 may also be connected to removable or external non-volatile memory and/or storage (such as a removable memory card, memory key drive, networked storage, etc.) through an input/output device interface 1332.

Computer instructions for operating the server/vulnerability detector 1320 and its various components may be executed by the controller(s)/processor(s) 1304, using the memory 1306 as temporary "working" storage at runtime. The server's/vulnerability detector's 1320 computer instructions may be stored in a non-transitory manner in non-volatile memory 1306, storage 1308, or an external device(s). For example, the vulnerability detector 1301, which may be implemented in software that is stored in the memory 1306 and executed by the one or more processors 1304, may be operable to perform some or all of the implementations discussed herein. Alternatively, some or all of the executable instructions of the vulnerability detector 1301 and/or executable instructions for other components of the server/vulnerability detector 1320 may be embedded in hardware or firmware, in addition to or instead of, software.

The server/vulnerability detector 1320 may also maintain a server certificate 1310 for the server. The server certificate 1310 may be stored in the memory 1306 or otherwise maintained in the server.

The server/vulnerability detector 1320 may also include input/output device interfaces 1332. A variety of components may be connected through the input/output device interfaces. Additionally, the server/vulnerability detector 1320 may include an address/data bus 1324 for conveying data among components of the server 1320. Each component within the server/vulnerability detector 1320 may also be directly connected to other components in addition to (or instead of) being connected to other components across the bus 1324.

The server/vulnerability detector 1320 may use a wired and/or wireless connection to receive handshake messages as they are sent between a client device and a server, as discussed above. Any form of wired and/or wireless communication may be utilized. For example, any one or more of 802.15.4 (ZIGBEE), 802.11 (WI-FI), 802.16 (WiMAX), BLUETOOTH, Z-WAVE, near field communication ("NFC"), direct network connection, etc., may be used.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers, communications, encryption, etc., should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk, and/or other media. In addition, one or more of the components may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method to determine one or more device vulnerabilities of a client device, comprising:
    receiving, at a vulnerability detector, a client hello message sent from the client device to a server, the vulnerability detector positioned to observe messages sent between the client device and the server as part of a Transport Layer Security ("TLS") handshake;
    determining that a server certificate sent from the server to the client device in response to the client hello message is at least one of incorrectly signed or expired;
    receiving, at the vulnerability detector, a client key exchange message sent from the client device to the server;
    determining, with the vulnerability detector and based on receipt of the client key exchange message and determination that the server certificate is at least one of incorrectly signed or expired, that the client device validated the server based on an invalid server certificate;
    generating, based at least in part on the processing of the client hello message and in response to determining that the client key exchange message was received and that the server certificate is at least one of incorrectly signed or expired, a client device vulnerability log indicating that the client device validated the server based on the invalid server certificate; and
    providing the client device vulnerability log to cause a vulnerability of the client device to be resolved.

2. The computer-implemented method of claim 1, further comprising:
    causing, by the vulnerability detector, the server to send to the client device, in response to the client hello message, the invalid server certificate, wherein the invalid server certificate is at least one of expired, incorrectly signed, or indicates a Common Name ("CN") or Subject Alternative Name ("SAN") that is different than a server name indication ("SNI") included in the client hello message.

3. The computer-implemented method of claim 1, further comprising:
   determining, at the vulnerability detector, a cipher suite of a plurality of cipher suites selected by the server; and
   verifying, based at least in part on the client key exchange message, that the cipher suite is supported by the client device.

4. The computer-implemented method of claim 1, wherein the vulnerability detector is included in the server or sends instructions to the server.

5. The computer-implemented method of claim 1, further comprising:
   receiving a client certificate sent from the client device to the server;
   processing the client certificate to determine at least one of:
      that the client certificate is expired; or
      that the client certificate is not properly signed; and
   including in the client device vulnerability log an indication of at least one of the client certificate of the client device is expired or that the client certificate is not properly signed.

6. The computer-implemented method of claim 1, further comprising:
   receiving a certificate verify message sent from the client device to the server, wherein the certificate verify message is signed with a digital signature;
   determining that the digital signature does not correspond to a client certificate of the client device; and
   including, in the client device vulnerability log, an indication that the digital signature of the certificate verify message does not match the client certificate of the client device.

7. A computing system, comprising:
   one or more processors; and
   a memory storing program instructions that, when executed by the one or more processors, cause the one or more processors to at least:
      receive a client hello message sent from a client device to a server as part of an encryption protocol handshake;
      determine that at least one of a common name ("CN") or a subject alternative name ("SAN") included in a server hello message sent from the server to the client device in response to the client hello message does not match a server name indication ("SNI") included in the client hello message;
      detect a client key exchange message sent from the client device to the server;
      determine, based at least in part on the detection of the client key exchange message and the determination that at least one of the CN or the SAN does not match the SNI, that the client device validated the server based on an invalid server certificate;
      generate, based at least in part on the determination that at least one of the CN or the SAN does not match the SNI, a client device vulnerability log indicting that the client device validated the server based on the invalid server certificate; and
      provide the client device vulnerability log to cause a vulnerability of the client device to be resolved.

8. The computing system of claim 7, wherein the program instructions that, when executed by the one or more processors further cause the one or more processors to at least:
   determine that a server certificate sent from the server to the client device in response to the client hello message is incorrectly signed;
   determine, based at least in part on the detection of the client key exchange message and the determination that the server certificate is incorrectly signed, that the client device validated the server based on the invalid server certificate; and
   include in the client device vulnerability log an indication that the client device validated the server based on the invalid server certificate that is incorrectly signed.

9. The computing system of claim 7, wherein the program instructions that, when executed by the one or more processors further cause the one or more processors to at least:
   determine that a server certificate sent from the server to the client device in response to the client hello message is expired;
   determine, based at least in part on the detection of the client key exchange message and the determination that the server certificate is expired, that the client device validated the server based on the invalid server certificate; and
   include in the client device vulnerability log an indication that the client device validated the server based on the invalid server certificate that is expired.

10. The computing system of claim 7, wherein the program instructions that, when executed by the one or more processors further cause the one or more processors to at least:
   receive a client certificate sent from the client device to the server;
   process the client certificate to determine at least one of:
      that the client certificate is expired; or
      that the client certificate is not properly signed; and
   include in the client device vulnerability log an indication of at least one of the client certificate of the client device is expired or that the client certificate is not properly signed.

11. The computing system of claim 7, wherein the program instructions that when executed by the one or more processors further cause the one or more processors to at least:
   receive a certificate verify message sent from the client device to the server, wherein the certificate verify message is signed with a digital signature;
   determine that the digital signature does not correspond to a client certificate of the client device; and
   include, in the client device vulnerability log, an indication that the digital signature of the certificate verify message does not match the client certificate of the client device.

12. The computing system of claim 7, wherein the one or more processors and the memory storing the program instructions are included in the server.

13. The computing system of claim 7, wherein the one or more processors and the memory storing the program instructions are included in at least one of a router, a firewall, or a gateway connected to the client device.

14. The computing system of claim 7, wherein the one or more processors and the memory storing the program instructions are independent of the server and the client device.

15. A computing system comprising:
one or more processors; and
a memory storing program instructions that, when executed by the one or more processors, cause the one or more processors to at least:
receive a client hello message sent from a client device to a server as part of an encryption protocol handshake;
process the client hello message to determine an indication of a plurality of cipher suites supported by the client device;
determine a cipher suite of the plurality of cipher suites selected by the server;
determine that a client key exchange message was not received from the client device;
in response to a determination that the client key exchange message was not received from the client device, determine that the cipher suite is not supported by the client device;
generate, based at least in part on the determination that the cipher suite is not supported by the client device, a client device vulnerability log indicating that the client device does not support the cipher suite of the plurality of cipher suites; and
provide the client device vulnerability log to cause a vulnerability of the client device to be resolved.

16. A method to determine a device vulnerability based on messages exchanged between a first device and a second device as part of a cryptographic protocol handshake to establish an encrypted communication between the first device and the second device, comprising:
receiving, as part of the cryptographic protocol handshake, a first message sent from the first device to the second device, wherein the first message is unencrypted and indicates at least one of a protocol version supported by the first device, a device time, a client random, or an indication of a plurality of algorithm suites supported by the first device;
receiving, as part of the cryptographic protocol handshake, a second message sent from the second device to the first device in response to the first message, wherein the second message is unencrypted and indicates at least one of a first algorithm suite from the plurality of algorithm suites selected by the second device, a certificate that includes a public key, or a server random;
receiving, as part of the cryptographic protocol handshake, a third message sent from the first device to the second device;
determining that at least one item included in the second message is inaccurate;
determining, based at least in part on receiving the third message and the determination that at least one item in the second message is inaccurate, that the first device improperly validated the second device;
generating a device vulnerability log that indicates that the first device improperly validated the second device; and
providing the device vulnerability log to cause the device vulnerability of the first device to be resolved.

17. The method of claim 16, wherein the device vulnerability is at least one of:
that the protocol version supported by the first device is outdated;
that the device time is incorrect;
that the client random is not random;
that a second algorithm suite of the plurality of algorithm suites is an unsupported algorithm suite; or
that a validation of the second device by the first device is based on an invalid certificate.

18. The method of claim 16, further comprising:
receiving, as part of the cryptographic protocol handshake, a fourth message sent from the first device to the second device, wherein the fourth message includes a certificate of the first device; and
wherein processing includes processing each of the first message, the second message, the fourth message, and the receipt of the third message to determine the device vulnerability of the first device.

19. The method of claim 18, wherein processing the fourth message includes determining that the certificate of the first device is at least one of expired or not properly signed.

20. The method of claim 16, further comprising:
in response to determining the device vulnerability of the first device, causing the cryptographic protocol handshake to be terminated prior to a completion of the cryptographic protocol handshake.

21. The method of claim 16, further comprising:
determining, based at least in part on one or more of the first message, the second message, or the receipt of the third message, at least one of:
that a validation of the second device by the first device is proper; or
that the first algorithm suite selected by the second device is supported by the first device.

22. The method of claim 16, wherein the item is at least one of a common name ("CN") or a subject alternative name ("SAN") included in the second message that does not match a server name indication ("SNI") included in the first message.

* * * * *